(12) United States Patent
Pham et al.

(10) Patent No.: US 11,759,785 B2
(45) Date of Patent: *Sep. 19, 2023

(54) RECEPTACLE HOLDERS, SYSTEMS, AND METHODS FOR CAPACITIVE FLUID LEVEL DETECTION

(71) Applicant: Gen-Probe Incorporated, San Diego, CA (US)

(72) Inventors: Trung Q. Pham, Chula Vista, CA (US); Jerry W. Jeffers, II, San Diego, CA (US); David Buse, San Diego, CA (US); Steven G. Grubbs, San Diego, CA (US)

(73) Assignee: GEN-PROBE INCORPORATED, San Diego, CA (US)

( * ) Notice: Subject to any disclaimer, the term of this patent is extended or adjusted under 35 U.S.C. 154(b) by 494 days.

This patent is subject to a terminal disclaimer.

(21) Appl. No.: 16/629,823

(22) PCT Filed: Jul. 9, 2018

(86) PCT No.: PCT/US2018/041286
§ 371 (c)(1),
(2) Date: Jan. 9, 2020

(87) PCT Pub. No.: WO2019/014124
PCT Pub. Date: Jan. 17, 2019

(65) Prior Publication Data
US 2021/0146369 A1    May 20, 2021

Related U.S. Application Data

(60) Provisional application No. 62/530,743, filed on Jul. 10, 2017.

(51) Int. Cl.
*B01L 9/00*    (2006.01)
*B01L 3/00*    (2006.01)
(Continued)

(52) U.S. Cl.
CPC ............... *B01L 9/00* (2013.01); *B01L 3/54* (2013.01); *G01F 23/26* (2013.01);
(Continued)

(58) Field of Classification Search
None
See application file for complete search history.

(56) References Cited

U.S. PATENT DOCUMENTS

| 5,262,731 A | 11/1993 | Mizoguchi |
| 5,772,238 A | 6/1998 | Breed et al. |

(Continued)

FOREIGN PATENT DOCUMENTS

| CN | 102893153 A | 1/2013 |
| CN | 105188938 A | 12/2015 |

(Continued)

OTHER PUBLICATIONS

PCT Search Report and Written Opinion, International application No. PCT/US2018/041286, dated Dec. 7, 2018.

(Continued)

*Primary Examiner* — P. Kathryn Wright
(74) *Attorney, Agent, or Firm* — Sterne, Kessler, Goldstein & Fox P.L.L.C.; Charles B. Cappellari

(57) ABSTRACT

A receptacle holder for supporting at least one fluid-containing receptacle includes a body and an RFID transponder. The body includes an electrically conductive portion defining a first recess configured to receive at least a first fluid-containing receptacle, and an electrically non-conductive portion attached to the electrically conductive portion. The RFID transponder is disposed on the electrically non-conductive portion of the body, and stores information about the receptacle holder. The receptacle holder can also include the first fluid-containing receptacle received within the first recess.

28 Claims, 17 Drawing Sheets

(51) Int. Cl.
*G01N 35/10* (2006.01)
*G01F 23/26* (2022.01)
*G01N 35/00* (2006.01)
*G01N 35/04* (2006.01)

(52) U.S. Cl.
CPC .... *G01N 35/1009* (2013.01); *B01L 2300/022* (2013.01); *G01N 2035/00782* (2013.01); *G01N 2035/0412* (2013.01); *G01N 2035/0431* (2013.01); *G01N 2035/1025* (2013.01)

(56) References Cited

U.S. PATENT DOCUMENTS

| | | |
|---|---|---|
| 8,569,019 B2 | 10/2013 | Ammann et al. |
| 2002/0009393 A1 | 1/2002 | Ishizawa et al. |
| 2010/0322822 A1 | 12/2010 | Fritchie et al. |
| 2015/0227142 A1 | 8/2015 | Hutchings |
| 2015/0366383 A1 | 12/2015 | Raunio et al. |
| 2016/0018381 A1 | 1/2016 | Potyrailo et al. |
| 2016/0060680 A1 | 3/2016 | Buse et al. |
| 2016/0063287 A1 | 3/2016 | Birrer et al. |
| 2017/0059386 A1 | 3/2017 | Munoz |
| 2018/0282788 A1 | 10/2018 | Opalsky et al. |
| 2018/0290143 A1* | 10/2018 | Cofano ................ G01F 23/266 |

FOREIGN PATENT DOCUMENTS

| | | |
|---|---|---|
| CN | 105193189 A | 12/2015 |
| CN | 105389602 A | 3/2016 |
| JP | 2018-071808 A | 11/2018 |
| WO | 2011/121352 A1 | 10/2011 |
| WO | 2014/153193 A2 | 9/2014 |

OTHER PUBLICATIONS

CNIPA First Office Action, Chinese Application No. 201880045565.8, dated Jun. 25, 2021.
CNIPA Search Report, Chinese Application No. 201880045565.8, dated Jun. 16, 2021.
CNIPA Second Office Action, Chinese Application No. 201880045565.8, dated Apr. 14, 2022.
JPO Official Action, Japanese Patent Application No. 2020-500836, dated Aug. 25, 2022.
IPA Examination report No. 1 for standard patent application, Australian Application No. 20182998890, dated Sep. 9, 2022.
Warehousing Management Practice: Knowledge Channel of DuXiu, RFID, Mei Yihua, p. 234, Jul. 2015.
EPO Communication pursuant to Article 94(3) EPC, European Application No. 18752899.7, dated Apr. 5, 2023.

* cited by examiner

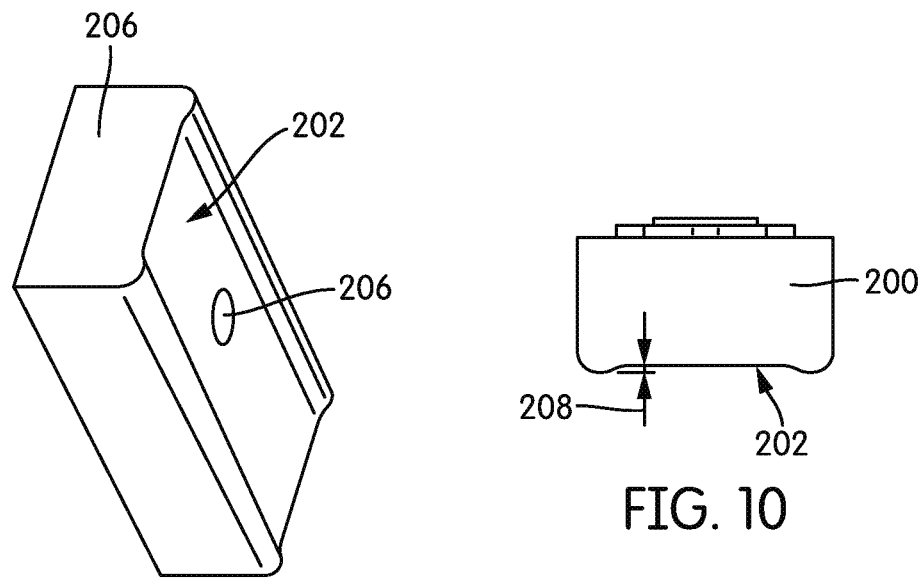
FIG. 9
FIG. 10
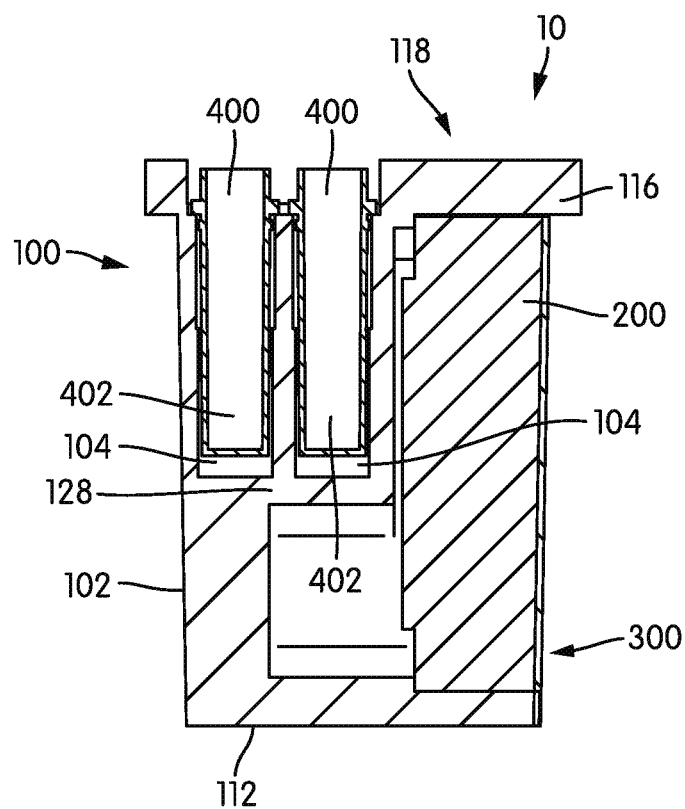
FIG. 11

RECEPTACLE HOLDERS, SYSTEMS, AND METHODS FOR CAPACITIVE FLUID LEVEL DETECTION

BACKGROUND

Field

This disclosure is directed to holders that support fluid-containing receptacles and systems for detecting a fluid level through capacitive techniques, and related methods of use.

Background

While processing a sample, a sample processing instrument can consume a fluid contained within a receptacle, thereby lowering the fluid level. To precisely control the fluid transfer, the sample processing instrument can detect the fluid level within the receptacle using, for example, capacitive fluid level sensing. With capacitive fluid level sensing, the fluid in the fluid-containing receptacle is capacitively coupled to an electrical ground or voltage source, thereby forming one conductor of a capacitor. This electrical coupling can be achieved by using electrically conductive materials to form the holder that supports the fluid-containing receptacle. But electrically conductive materials can interfere with the information transmission between an RFID transponder on the receptacle holder and an RFID reader of the sample processing instrument. For example, electrically conductive materials reflect energy emitted to or from the RFID transponder, degrading the information transmission.

BRIEF SUMMARY

In some embodiments, a receptacle holder for supporting at least one fluid-containing receptacle can include a body and an RFID transponder. The body can include an electrically conductive portion defining a first recess configured to receive at least a first fluid-containing receptacle, and an electrically non-conductive portion attached to the electrically conductive portion. The RFID transponder is disposed on the electrically non-conductive portion of the body, and stores information about the receptacle holder. The receptacle holder can also include the first fluid-containing receptacle received within the first recess.

The receptacle holder can also include a surface configured to receive a user-provided indicator of a process to be performed using fluid in the first fluid-containing receptacle. This surface can include a dry-erase writing surface, and the user-provided indicator can be a non-permanent marking from a writing instrument.

The electrically conductive portion can further define a second recess configured to receive a second fluid-containing receptacle. The first recess and the second recess can have similar dimensions, or the first recess and the second recess can have different dimensions. The electrically conductive portion can be a single unitary piece.

The first recess can conform to the shape of the first fluid-containing receptacle.

The electrically non-conductive portion can define a recess, and the RFID transponder can be disposed entirely within the recess defined by the electrically non-conductive portion. The electrically non-conductive portion can be a single unitary piece.

The electrically non-conductive portion can define a channel that is configured to receive a portion of the first fluid-containing receptacle, and axially aligned with the first recess of the electrically conductive portion. The electrically non-conductive portion can be fastened to the electrically conductive portion using at least one fastener.

The information about the receptacle holder can include at least one of (a) a receptacle identifier, (b) a holder identifier, and (c) an identifier of a process to be performed using fluid contained in the first fluid-containing receptacle. For example, at least one of (a) the receptacle identifier and (b) the holder identifier can have a known association with the process to be performed using fluid contained in the first fluid-containing receptacle.

In some embodiments, a receptacle holder for supporting at least one fluid-containing receptacle can include a body and an RFID transponder. The body can include an electrically non-conductive portion defining a first recess configured to receive a first fluid-containing receptacle, and an electrical conductor. The electrical conductor can include a first electrically conductive portion that is adjacent a portion of the first recess. The electrical conductor also can include a second electrically conductive portion electrically coupled to the first electrically conductive portion, and configured to be electrically coupled to an electrical ground or voltage source separate from the receptacle holder. The RFID transponder is disposed on the electrically non-conductive portion, and stores information about the receptacle holder. The receptacle holder can also include the first fluid-containing receptacle received within the first recess.

The first electrically conductive portion defines a recess configured to receive a closed end portion of the first fluid-containing receptacle. The recess of the first electrically conductive portion can conform to the shape of the closed end portion of the first fluid-containing receptacle. The first electrically conductive portion and the second electrically conductive portion can be discrete components that are attached to each other, or the first electrically conductive portion and the second electrically conductive portion can be integral components forming a single unitary piece.

The second electrically conductive portion can define an exterior surface of the body. The exterior surface can include a bottom surface of the body.

The electrically non-conductive portion further defines a second recess configured to receive a second fluid-containing receptacle. The first recess and the second recess can have similar dimensions, or the first recess and the second recess can have different dimensions.

The electrically non-conductive portion can define a recess, and the RFID transponder can be disposed entirely within the recess defined by the electrically non-conductive portion.

The electrically non-conductive portion can be a single unitary piece.

The information about the receptacle holder can include at least one of (a) a receptacle identifier, (b) a holder identifier, and (c) an identifier of a process to be performed using fluid contained in the first fluid-containing receptacle. At least one of the receptacle identifier and the holder identifier can have a known association with the process to be performed using fluid contained in the first fluid-containing receptacle.

The receptacle holder can also include a surface configured to receive a user-provided indicator of a process to be performed using fluid in the first fluid-containing receptacle. The surface configured to receive the user-provided indicator can include a dry-erase writing surface, and the user-provided indicator can include a non-permanent marking from a writing instrument.

In some embodiments, a method for fluid handling can include reading, using an RFID reader, information about a first receptacle holder. The information about the first receptacle holder can be transmitted from a first RFID transponder disposed on a first body of the first receptacle holder that supports a first fluid-containing receptacle. The method can also include aligning a robotic fluid transfer device with the first fluid-containing receptacle based on the information about the first receptacle holder read by the RFID reader. The method can further include detecting a change in capacitance between an electrically conductive probe of the robotic fluid transfer device and an electrical ground or voltage source capacitively coupled to fluid contained in the first fluid-containing receptacle to determine when the probe has contacted the fluid contained in the first fluid-containing receptacle. And the method can include aspirating, using the robotic fluid transfer device, a portion of the fluid contained in the first fluid-containing receptacle.

The method can also include dispensing, using the fluid transfer device, the aspirated portion of fluid into a second receptacle.

The method can also include reading, using the RFID reader, information about a second receptacle holder. The information about the second receptacle holder can be transmitted from a second RFID transponder disposed on a second body of the second receptacle holder that supports a second fluid-containing receptacle. The method can include aligning the robotic fluid transfer device with the second fluid-containing receptacle based on the information about the second receptacle holder read by the RFID reader. The method further can include detecting a change in capacitance between the electrically conductive probe of the robotic fluid transfer device and the electrical ground or voltage source capacitively coupled to fluid contained in the second fluid-containing receptacle to determine when the probe has reached the fluid contained in the second fluid-containing receptacle. And the method can include aspirating, using the robotic fluid transfer device, a portion of the fluid contained in the second fluid-containing receptacle.

The method can also include dispensing, using the fluid transfer device, the aspirated portion of fluid from the second fluid-containing receptacle into a second receptacle.

The method can use receptacle holders of any of the described embodiments.

In some embodiments, a sample processing method can include prompting, at a user interface of a sample processing instrument, a user to enter at least one first user input. The prompting can be based on first information transmitted from a first RFID transponder disposed on a first receptacle holder within the sample processing instrument. The at least one first user input indicates second information about the first receptacle holder. The method can include receiving, at the user interface, the at least one first user input, and processing, using the sample processing instrument, at least one first sample based on the at least one first user input.

The method can also include displaying an indication on the user interface that the first receptacle holder is present or absent within the sample processing instrument.

The second information can include an indication of whether a first fluid-containing receptacle is disposed in the first receptacle holder. The second information can also include an indication of a first assay to be performed using fluid contained in the first fluid-containing receptacle, and the processing step can include performing the first assay on the at least one first sample. The second information can also include an indication of the maximum quantity of first assays that can be performed using the fluid contained in the first fluid-containing receptacle.

The method can also include displaying an indication on the user interface that the first fluid-containing receptacle is disposed on the first receptacle holder, The second information can include an indication of whether a second fluid-containing receptacle is disposed in the first receptacle holder. The second information further can include an indication of a second assay to be performed using fluid contained in the second fluid-containing receptacle. The second information can include a maximum quantity of second assays that can be performed using the fluid contained in the second fluid-containing receptacle. And the processing step can include performing the second assay on the at least one first sample.

The method can also include displaying an indication on the user interface that the second fluid-containing receptacle is disposed on the first receptacle holder.

The at least one first user input can include a selection from a menu of options displayed on the user interface, or user-entered alphanumeric text.

The fluid in the first fluid-containing receptacle can include a reconstitution buffer that includes a primer for nucleic acid amplification and a probe for detection of a particular analyte.

The step of receiving the first user input can occur after a user visually references a user-provided indicator on the first receptacle holder of the assay to be performed using fluid contained in the first fluid-containing receptacle.

The method can also include prompting, at the user interface of the sample processing instrument, the user to enter at least one second user input based on third information transmitted from a second RFID transponder disposed on a second receptacle holder within the sample processing instrument. The at least one second user input can indicate fourth information about the second receptacle holder. The method can also include receiving, at the user interface of the sample processing instrument, the at least one second user input, and processing, using the sample processing instrument, at least one second sample based on the at least one second user input.

The method can also include displaying an indication on the user interface that the second receptacle holder is present or absent within the sample processing instrument.

The fourth information can include an indication of whether a third fluid-containing receptacle is disposed in the second receptacle holder. The fourth information can include an indication of a third assay to be performed using fluid contained in the third fluid-containing receptacle.

The processing step can include performing the third assay on the at least one second sample. The fourth information can include a maximum quantity of third assays that can be performed using the fluid contained in the third fluid-containing receptacle.

The method can include displaying an indication on the user interface that the third fluid-containing receptacle is disposed on the second receptacle holder.

The fourth information can include an indication of whether a fourth fluid-containing receptacle is disposed in the second receptacle holder. The fourth information can include an indication of a fourth assay to be performed using fluid contained in the fourth fluid-containing receptacle. And the processing step can include performing the fourth assay on the at least one second sample.

The fourth information can further include a maximum quantity of fourth assays that can be performed using the fluid contained in the fourth fluid-containing receptacle.

The method can include displaying an indication on the user interface that the fourth fluid-containing is disposed on the second receptacle holder.

The at least one second user input can include a selection from a menu of options displayed on the user interface. The at least one second user input can include user-entered alphanumeric text.

The fluid in the third fluid-containing receptacle can include a reconstitution buffer comprising a primer for nucleic acid amplification and a probe for detection of a particular analyte.

The step of receiving the at least one second user input occurs after the user visually references a user-provided indicator on the second receptacle holder.

Further features and advantages of the embodiments, as well as the structure and operational of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE FIGURES

The accompanying drawings, which are incorporated herein and form part of the specification, illustrate the present disclosure and, together with the description, further serve to explain the principles of the disclosure.

FIG. 9 is a side perspective view of an electrically non-conductive portion of the receptacle holder of FIG. 1, according to an embodiment.

FIG. 10 is a top view of the electrically non-conductive portion of FIG. 9, according to an embodiment.

FIG. 11 is a cross-sectional view of the receptacle holder taken along line 11-11 in FIG. 1, according to an embodiment.

The features and advantages of the embodiments will become more apparent from the detailed description set forth below when taken in conjunction with the drawings, in which like reference characters identify corresponding elements throughout.

DETAILED DESCRIPTION

Figure 1:
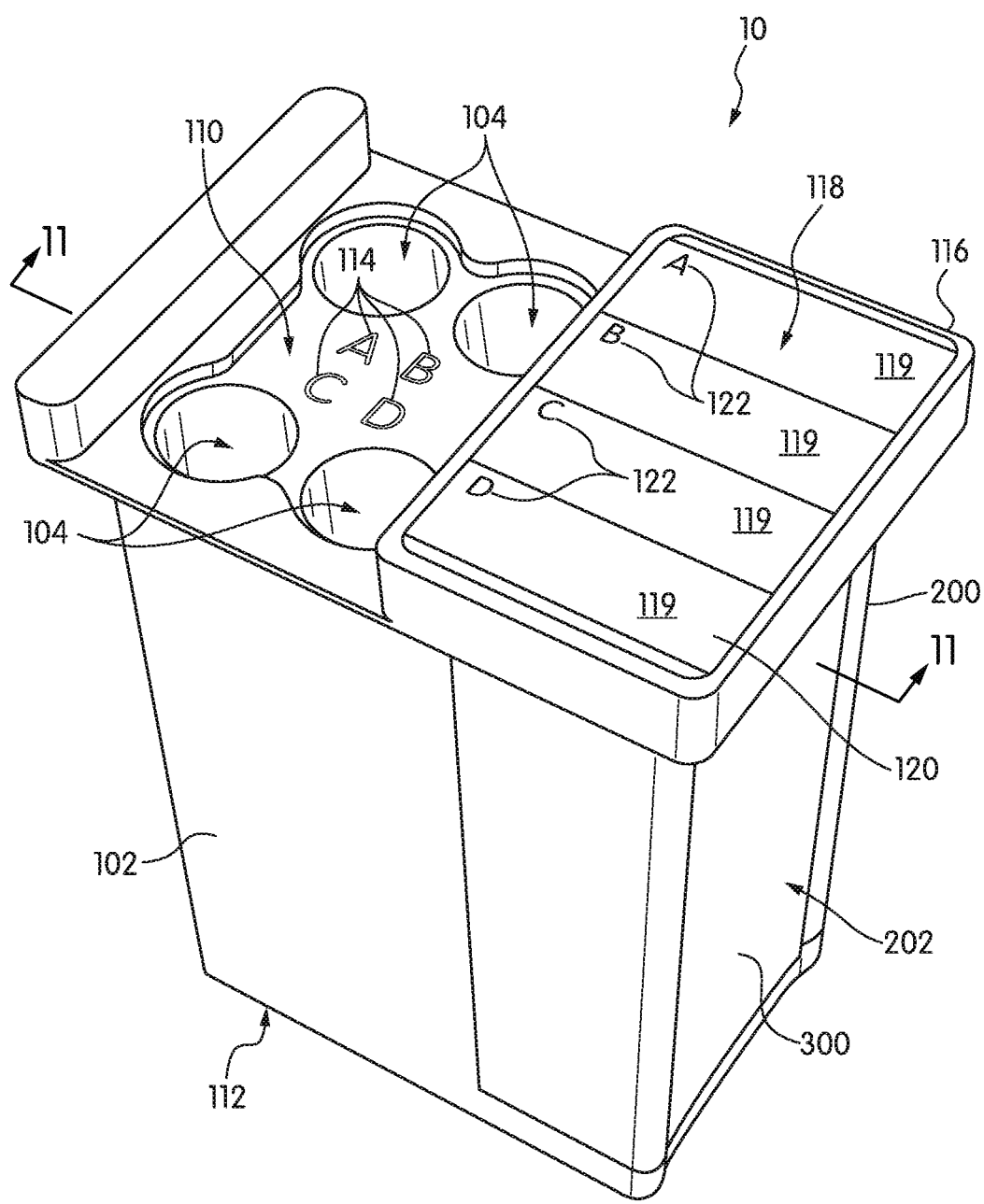
FIG. 1 is a perspective view of an exemplary receptacle holder, according to an embodiment.

Reference will now be made in detail to examples of the present disclosure, which are illustrated in the accompanying drawings. Wherever possible, the same or similar reference numbers will be used throughout the drawings to refer to the same or like parts. Although embodiments of the current disclosure are described with reference to its application in an instrument that performs nucleic acid-based tests, this is only exemplary. As a person skilled in the art would recognize, embodiments of the current disclosure can be applied to any application.

Unless defined otherwise, all terms of art, notations and other scientific terms/terminology used herein have the same meaning as is commonly understood by one of ordinary skill in the art to which this disclosure belongs. All patents, applications, published applications and other publications (literature) referred to herein are incorporated by reference in their entirety. If a definition set forth in this section is contrary to or otherwise inconsistent with a definition set forth in the literature incorporated herein by reference, the definition set forth in this section prevails over the definition that is incorporated by reference.

References in the specification to "one embodiment," "an embodiment," a "further embodiment," "an example embodiment," "some aspects," "a further aspect," "aspects," "for example," "exemplary," "some embodiments," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic is also a description in connection with other embodiments whether or not explicitly described. Further, as used herein, "a" or "an" means "at least one" or "one or more."

Further, the description below may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, inside, outside, inner, outer, proximal, distal, in front of, behind, next to, adjacent, between, horizontal, vertical, diagonal, longitudinal, transverse, etc., are used for convenience in referring to such component, apparatus, location, feature, or a portion thereof in the drawings and are not intended to be limiting.

As used herein, a "sample processing instrument" refers to any instrument capable of performing a processing step on a sample contained within a receptacle. A sample processing instrument includes any instrument capable of processing and/or analyzing samples. For example, a sample processing instrument includes any instrument capable of performing a test or analytical procedure on a sample and rendering a result or analysis. For example, a sample processing instrument includes any instrument capable performing a test on a sample to determine the presence of an analyte or one or more constituents of the sample. Any instrument capable of performing nucleic-acid-based tests (NATs), including nucleic acid-based amplification tests (NAATs); DNA sequencing; immunoassays; or chemical analyses on a sample is included in this definition of a sample processing instrument. Exemplary instruments capable performing a NAAT on a sample to determine the presence or absence of an analyte include the Tigris®, Panther®, and Panther Fusion® systems sold by Hologic, Inc., Marlborough, Mass., as well as any of the instruments disclosed in U.S. Patent Application Publication No. 2016/0060680, published Mar. 3, 2016, U.S. Pat. No. 8,569,019, issued Oct. 29, 2013, and U.S. Provisional Appl. No. 62/480, 977, filed Apr. 3, 2017. A sample processing instrument also includes any instrument that only performs sample preparation steps and is not capable of analyzing a sample and/or rendering a result. For example, an instrument that transfers a sample from one receptacle to another receptacle or adds one substance to a receptacle containing a sample, but does not perform a complete test or analysis with the sample, is a sample processing instrument. For example, an instrument that only performs sample preparation steps to isolate and/or purify an analyte of interest is a sample processing instrument. An exemplary sample processing instrument that only performs sample preparation steps is the Tomcat® system sold by Hologic, Inc., Marlborough, Mass.

As used herein, a "sample" refers to any material to be analyzed, regardless of the source. The material can be in its native form or any stage of processing (e.g., the material can be chemically altered or it can be one or more components of a sample that have been separated and/or purified from one or more other components of the sample). A sample can be obtained from any source, including, but not limited to, an animal, environmental, food, industrial or water source. Animal samples include, but are not limited to, peripheral blood, plasma, serum, bone marrow, urine, bile, mucus, phlegm, saliva, cerebrospinal fluid, stool, biopsy tissue including lymph nodes, respiratory tissue or exudates, gastrointestinal tissue, cervical swab samples, semen or other body or cellular fluids, tissues, or secretions. Samples can be diluted or contained within a receptacle containing diluents, transport media, preservative solution, or other fluids. As such, the term "sample" is intended to encompass samples contained within a diluent, transport media, and/or preservative or other fluid intended to hold a sample.

As used herein, a "receptacle" refers to any type of structure configured to contain something. Exemplary receptacles include, for example, any type of fluid container, including, for example, a tube, vial, cuvette, cartridge, microtiter plate, etc., that is configured to contain a fluid.

As used herein, "conductive," "electrically conductive," or "electrical conductor" means that the referenced structure or medium is suitable for carrying an electric current. As used herein, "non-conductive" or "electrically non-conductive" means that the referenced structure or medium is not suitable for carrying an electric current.

As used herein, "RFID transponder" means any device having an integrated circuit or chip connected to an antenna, which are collectively configured to store information and to transmit at least a portion of the information using radio waves.

As used herein, "capacitively coupled" means an alternating electrical current, but not a direct electrical current, can be transferred between the referenced coupled components.

Exemplary Receptacle Holders

While performing one or more processes on a sample, a sample processing instrument (described further below) can consume one or more fluids contained in one or more respective receptacles, lowering the fluid level within the respective fluid-containing receptacles. For example, each fluid-containing receptacle can contain one or more of the following: a sample fluid, an oil, a reconstitution buffer used to reconstitute a dried reagent, an elution buffer, solid supports (e.g., magnetically-responsive particles or silica beads) for immobilizing and purifying analytes of interest, and reagents for performing a test or analytical procedure, such as primers, probes and enzymes used to perform a NAAT. Exemplary NAATs can require thermal cycling (e.g., polymerase chain reactions (PCR)), or can be performed under isothermal conditions (e.g., transcription-mediated amplification (TMA), nucleic acid sequence based amplification (NASBA), and strand displacement amplification (SDA)).

As described further below, the sample processing instrument can detect the fluid level within a respective fluid-containing receptacle using, for example, capacitive fluid level sensing or any other suitable fluid level detection method. With capacitive fluid level sensing embodiments, the fluid in the fluid-containing receptacle can be capacitively coupled to an electrical ground (i.e., a conducting path to the earth or some conducting body serving in place of the earth) or voltage source (i.e., a source of a potential difference between two points within an electrical circuit). For example, a portion of a receptacle holder that supports the fluid-containing receptacle can be electrically conductive and electrically coupled to an electrical ground or voltage source, thereby forming a conductor of a capacitor. And the fluid in the fluid-containing receptacle can be capacitively coupled to the electrically conductive portion of the receptacle holder. A conductive element of the sample processing instrument, for example, a conductive probe tip (e.g., pipette tip formed from a conductive resin) of a fluid transfer device (e.g., robotic pipettor), can be electrically connected to the other of an electrical ground or voltage source not electrically connected to the receptacle holder. This conductive element can serve as the other conductor of the capacitor. The capacitance signal (a signal related to the capacitance)

measured between these two conductors can be used to detect when the conductive element of the sample processing instrument, for example, the conductive probe tip of the fluid transfer device, contacts the fluid. When the conductive element contacts the fluid surface, a spike can be observed in the capacitance signal.

In some embodiments, a receptacle holder can be configured to transmit (for example, wirelessly) information about the receptacle holder to the sample processing instrument. Exemplary information about the receptacle holder can include one or more of the following: (1) a receptacle identifier that identifies each receptacle supported by the receptacle holder; (2) a holder identifier that identifies the holder; and (3) a process identifier that identifies the processes (e.g., test) to be performed using fluids contained in the fluid-containing receptacles supported by the receptacle holder. In some embodiments, the receptacle identifier, the holder identifier, or both, each have a known association with the process to be performed using fluid contained in the respective fluid-containing receptacles supported by the receptacle holder. In some embodiment, the transmitted information indicates that the processes to be performed using fluids contained in the fluid containing receptacles supported by the receptacle holder are for NAATs.

In some embodiments, an RFID transponder (sometimes referred to as an RFID tag) can be disposed on the receptacle holder to wirelessly transmit the information about the receptacle holder to the sample processing instrument. And in some embodiments, the receptacle holder can be configured to minimize any interference to information transmission due to the electrically conductive portion of the receptacle holder that electrically connects the fluid to the electrical ground or voltage source. FIGS. 1-11 illustrate a receptacle holder 10 according to one such embodiment. The various embodiments of receptacle holder 10 will be described with collective reference to FIGS. 1-11.

Receptacle holder 10 is configured to support one or more fluid-containing receptacles (shown in FIG. 11) and to transmit information about holder 10 to the sample processing instrument that uses the contained fluid. Receptacle holder 10 is also configured to allow for capacitive fluid level sensing.

For example, receptacle holder 10 can be configured to securely support one or more fluid-containing receptacles 400 within a sample processing instrument. In some embodiments, holder 10 includes a body having an electrically conductive portion 102, an electrically non-conductive portion 200, and an RFID transponder 300 disposed on non-conductive portion 200.

Figure 2:
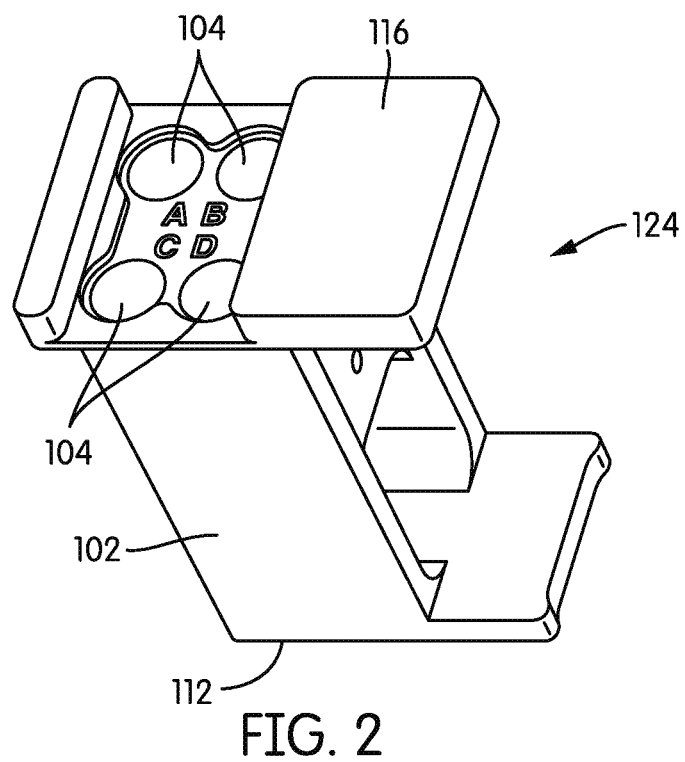
FIG. 2 is a perspective view of an electrically conductive portion of the receptacle holder of FIG. 1, according to an embodiment.
Figure 3:
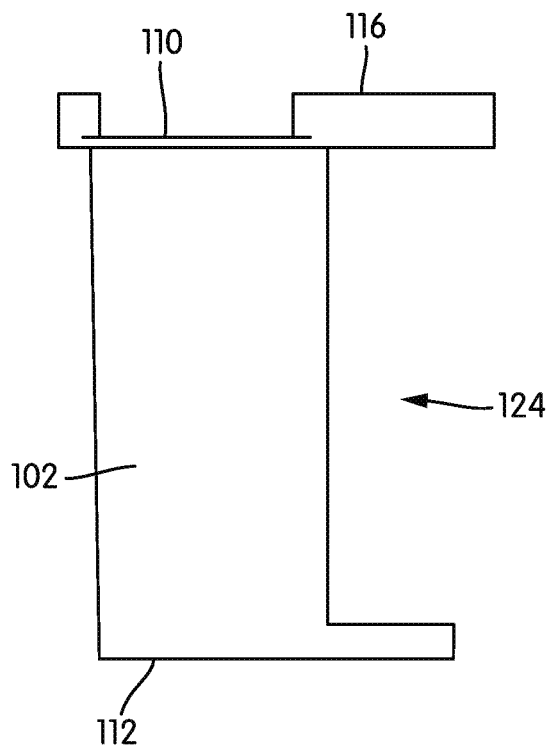
FIG. 3 is a side view of the electrically conductive portion of FIG. 2, according to an embodiment.
Figure 4:
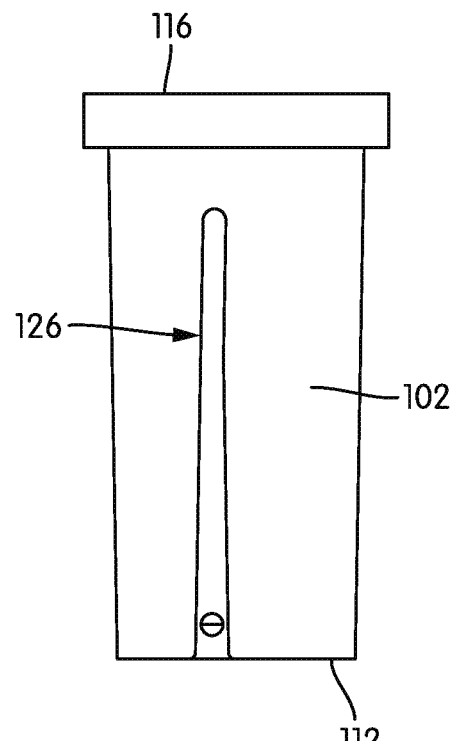
FIG. 4 is another side view of the electrically conductive portion of FIGS. 2 and 3, according to an embodiment.
Figure 5:
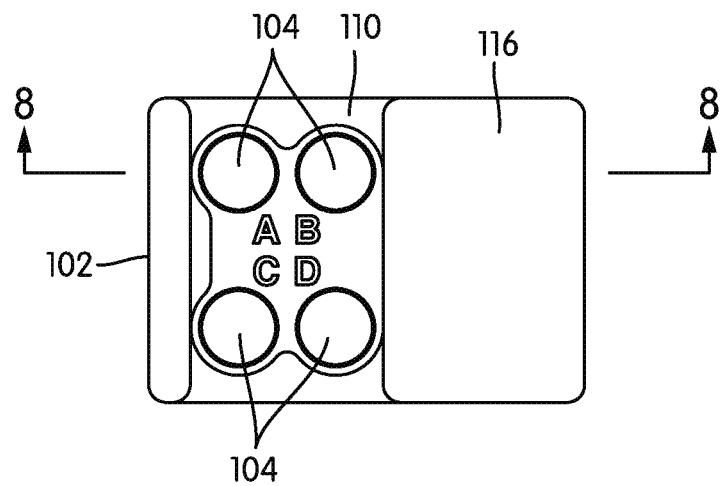
FIG. 5 is a top view of the electrically conductive portion of FIGS. 2-4, according to an embodiment.
Figure 6:
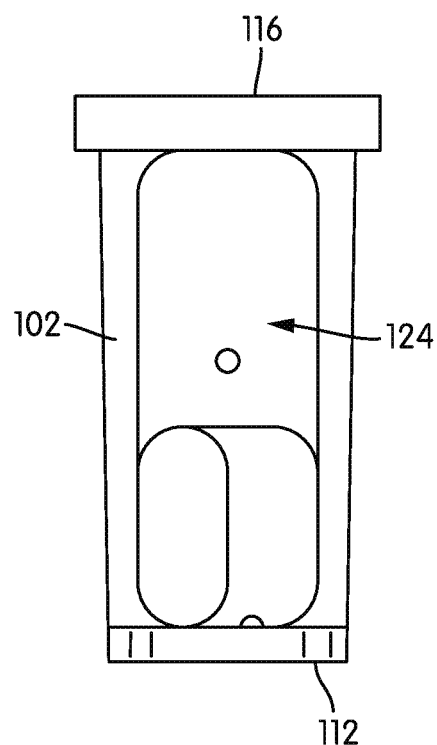
FIG. 6 is another side view of the electrically conductive portion of FIGS. 2-5, according to an embodiment.
Figure 7:
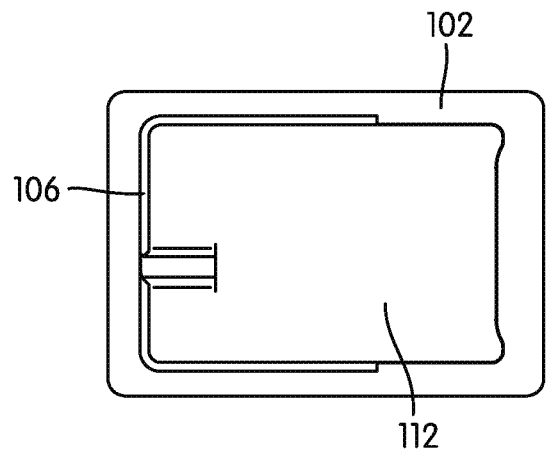
FIG. 7 is a bottom view of the electrically conductive portion of FIGS. 2-6, according to an embodiment.
Figure 8:
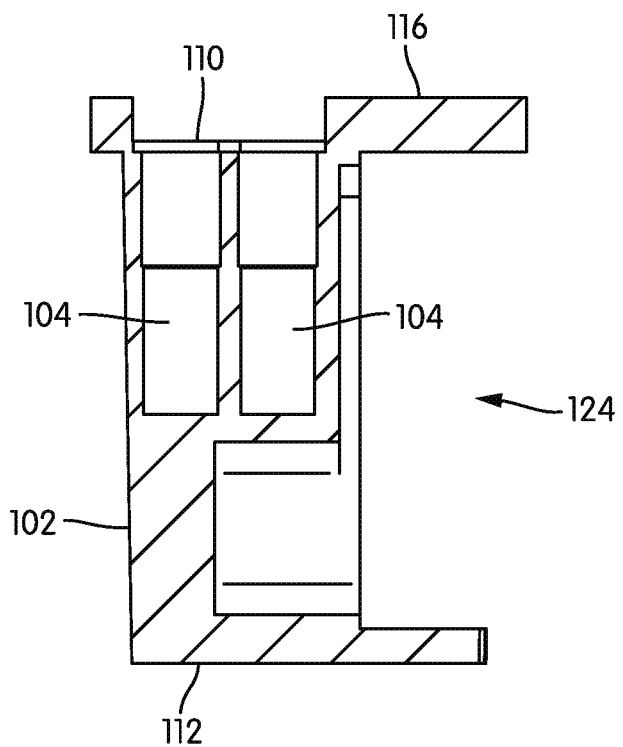
FIG. 8 is a cross-sectional view of the electrically conductive portion taken along line 8-8 in FIG. 5, according to an embodiment.

Conductive portion 102 can define one or more recesses 104 each configured to receive a respective fluid-containing receptacle 400. As best seen in FIGS. 1,2, and 5, conductive portion 102 can define four recesses 104 arranged in a rectangular configuration. Although conductive portion 102 of FIGS. 1-11 defines four recesses 104 arranged in a rectangular configuration, conductive portion 102 can define more or less than four recesses 104, and recesses 104 can be arranged in non-rectangular configurations, for example, circular or linear configurations.

As best seen in FIG. 11, each recess 104 is configured to receive a respective fluid-containing receptacle 400. In some embodiments, each recess 104 has similar dimensions (i.e., each recess 104 is similarly sized and shaped). In such embodiments, recesses 104 can each receive similarly dimensioned fluid-containing receptacles 400. In other embodiments (not shown), two or more of recesses 104 have different dimensions (i.e., two or more recesses 104 are sized and/or shaped differently). In such embodiments, recesses 104 can receive fluid-containing receptacles that have different dimensions. As best seen in FIGS. 1, 2, 5, 8, and 11, recesses 104 can be substantially cylindrical in some embodiments. In other embodiments (not shown), recesses 104 can have other non-cylindrical shapes, for example, conical, frusta-conical, rectangular, or any other suitable shape. As best seen in FIG. 11, each recess 104 can be dimensioned similar to the dimensions of the respective receptacle 400 to be received therein. That is, the shape and size of recesses 104 (which can be substantially cylindrical) can substantially conform to the shape and size of respective receptacles 400 (which can also be substantially cylindrical). In other embodiments (not shown), each recess 104 can be dimensioned different than the dimensions of the respective receptacle 400 to be received therein. That is, the shape and size of recesses 104 do not substantially conform to the shape and size of respective receptacles 400.

In some embodiments (as shown in FIG. 11), each recess 104 is configured such that a closed end 402 of respective fluid-containing receptacles 400 is adjacent to a receptacle-coupling portion 128 of conductive portion 102 of receptacle holder 10. Receptacle-coupling portion 128 can define at least a portion of the bottom closed end of each recess 104 in some embodiments. In some embodiments (not shown), closed end 402 contacts adjacent receptacle-coupling portion 128 when receptacle 400 is received within a respective recess 104. In some embodiments (as shown in FIG. 11), closed end 402 is spaced apart from adjacent receptacle-coupling portion 128 when receptacle 400 is received within a respective recess 104, but is still close enough to allow for capacitive coupling between a fluid contained within receptacle 400 and adjacent receptacle-coupling portion 128. Openings of recesses 104 are defined by a surface 110 of conductive portion 102. Surface 110 can be a top surface of conductive portion 102. Recesses 104 extend vertically downward from surface 110. Accordingly, receptacles 400 have vertical orientations when received within respective recesses 104.

Conductive portion 102 also includes a portion configured to be electrically coupled to an electrical ground or voltage source of the sample processing instrument. The electrical ground or voltage source is separate from receptacle holder 10. For example, in some embodiments, a bottom portion 112 of conductive portion 102, which defines a bottom exterior surface of conductive portion 102, is configured to be electrically coupled to an electrical ground or voltage source of the sample processing instrument. As best seen in FIG. 11, bottom portion 112 is electrically coupled to receptacle-coupling portion 128 that is adjacent fluid-containing receptacles 400 received within recesses 104 and capactively coupled to fluid in the fluid-containing receptacles 400. For example, bottom portion 112 and receptacle-coupling portion 128 that is adjacent fluid-containing receptacles 400 can be integral components of a single-piece conductive portion 102. Bottom portion 112 is electrically coupled to adjacent receptacle-coupling portion 128 due to this integral nature. In other embodiments (not shown), bottom portion 112 and adjacent receptacle-coupling portion 128 are discrete components that are directly attached or indirectly attached via an intermediate conductive component there between.

In some embodiments, portions of conductive portion 102 other than bottom portion 112 are configured to be electrically coupled to an electrical ground or voltage source of the sample processing instrument.

In some embodiments, conductive portion 102 also includes a plurality of recess-identifying indicators 114 for recesses 104. Indicators 114 can each provide a unique identifier for each recess 104. Indicators 114 can be alphanumeric text as shown in FIG. 1, a symbol, a color, or any other suitable indicator. As shown in FIG. 1, recess-identifying indicators 114 include the letters "A," "B," "C," and "D," that correspond to the respective recesses 104. In other embodiments (not shown), indicators 114 can be numerals, for example, "1," "2," "3," and "4." Indicators 114 can be disposed on surface 110 defining the openings of recesses 104 in some embodiments. Indicators 114 can be located adjacent the respective openings of recesses 104. In some embodiments, indicators 114 are integrally formed into surface 110. In other embodiments (not shown), indicators 114 are separate from conductive portion 102. For example, indicators 114 can be discrete labels affixed to surface 110.

In some embodiments, conductive portion 102 also includes a surface 118 configured to receive a user-provided indicator of a process (for example, an assay) to be performed using fluid in fluid-containing receptacles 400, which are received within recesses 104. In some embodiments, the user-provided indicator is a writing instrument mark, for example, a mark from a pencil, pen, marker, or other writing instrument. In some embodiments, surface 118 is configured to receive an erasable mark from a writing instrument. For example, surface 118 can include a dry-erase surface configured to receive an erasable mark form an erasable marker. In other embodiments, the user-provided indicator is a user-affixed label. The user-provided indicator can include alphanumeric text, symbols, colors, or any other indicator that has a known association with a particular process to be performed. For example, the user-provided indicator can be text with the name of a test to be performed using the fluid in the respective receptacle 400 received in recess 104.

In some embodiments, surface 118 includes a plurality of dedicated areas 119 for receiving the user-provided indicator for each receptacles 400 received within respective recesses 104. For example, as shown in FIG. 1, surface 118 can have four dedicated areas 119; each area 119 corresponds to a respective recess 104. In some embodiments, areas 119 include a plurality of recess-identifying indicators 122 disposed on surface 118. Indicators 122 can identify the association between the respective area 119 and the respective recess 104. Indicators 122 can be alphanumeric as shown in FIG. 1, a symbol, color, or any other suitable indicator. Recess-identifying indicators 122 can match recess-identifying indicators 114. For example, as shown in FIG. 1, recess-identifying indicators 122 include the letters "A," "B," "C," and "D," that correspond to the respective recess-identifying indicators 114 disposed on surface 110. As shown in FIG. 1, each dedicated area 119 can be visibly demarcated from adjacent areas 119, for example, via lines. In other embodiments, except for recess-identifying indicators 122, areas 119 are not visibly demarcated from each other.

In some embodiments, surface 118 is formed by a label 120 affixed to a surface of a indicia-receiving portion 116 of conductive portion 102. For example, as shown in FIG. 1, indicia-receiving portion 116 that receives label 120 extends (1) upward from surface 110 defining the openings of recesses 104 and (2) outward from surface 110. Accordingly, surface 118 is easily accessible to a user, allowing a user to provide the user-provided indicator of the process (for example, an assay) to be performed using fluid in fluid-containing receptacles 400 received within recesses 104. As shown in FIG. 1, indicia-receiving portion 116 and surface 118 can be located at the top portion of conductive portion 102, in some embodiments. In other embodiments (not shown), surface 118 can be located on a lateral surface of conductive portion 102. In some embodiments, surface 118 is integrally formed into indicia-receiving portion 116.

In some embodiments, conductive portion 102 defines a recess 124 (best seen in FIGS. 2, 3, 6, and 8) configured to receive at least a portion of a non-conductive portion 200. For example, as shown in FIGS. 2, 3, 6, and 8, recess 124 can be defined, at least in part, between top indicia-receiving portion 116 and bottom portion 112. In some embodiments, recess 124 is configured to receive the entire non-conductive portion 200. For example, recess 124 can be configured such that when non-conductive portion 200 is received within recess 124 the exterior lateral side surfaces of non-conductive portion 200 are flush with the adjacent exterior lateral side surfaces of conductive portion 102.

Conductive portion 102 can also include one of a key-way or a key that corresponds to the other of the key-way or the key on the sample processing instrument, in some embodiments. For example, as best seen in FIG. 4, conductive portion 102 can define key-way 126 that extends from bottom portion 112 upwards. Key-way 126 is configured to closely receive a key on the sample processing instrument. Key-way 126 and the key on the sample processing instrument help ensure that receptacle holder 10 is correctly positioned within the sample processing instrument.

Conductive portion 102 is made of one or more conductive materials, for example, conductive metals, such that portion 102 is electrically conductive. In some embodiments, the conductivity of the material(s) composing conductive portion 102 is greater than $1.0 \times 10^6$ (S/m) at 20° C. In some embodiments, the conductivity of the material(s) composing conductive portion 102 is less than $1.0 \times 10^6$ (S/m) at 20° C. Exemplary conductive metals include aluminum, silver, copper, gold, zinc, brass, bronze, iron, platinum, steel, stainless steel, or any other suitable metal.

In some embodiments, the exterior surface of conductive portion 102 includes a corrosion resistant conversion coating. For example, the corrosion resistant conversion coating can be a chromate conversion coating (also referred to as a chemical film or chem film), such as a Class 1A film, in some embodiments.

Referencing FIGS. 1 and 9-11, the body of receptacle holder 10 also includes non-conductive portion 200. Non-conductive portion 200 can be attached to conductive portion 102. Non-conductive portion 200 can be positioned within recess 124 defined by conductive portion 124. For example, non-conductive portion 200 can be fastened to conductive portion 102, in some embodiments. In such embodiments, non-conductive portion 200 can define at least one channel 206 for receiving a fastener that fastens non-conductive portion 200 to conductive portion 102. In other embodiments, non-conductive portion 200 is attached to conductive portion 102 using adhesive or an interference or press fit.

In some embodiments, non-conductive portion 200 defines a recess 202 configured to receive at least a portion of RFID transponder 300. The shape of recess 202 can conform to the shape of RFID transponder 300 in some embodiments. RFID transponder 300 can be attached to the surface defining recess 202. In some embodiments, recess 202 is configured to receive the entire RFID transponder 300. That is, a depth 208 of recess 202 is equal to or greater than the corresponding thickness of RFID transponder 300. In such embodiments, no portion of RFID transponder 300 extends outwardly beyond one or more surfaces of non-conductive portion 200 surrounding recess 202. For example, when viewed from either side, RFID transponder 300 is not visible in some embodiments due to being disposed in recess 202. Accordingly, RFID transponder 300 the risk of snagging on or being interfered with any component of the sample processing instrument is reduced.

In some embodiments, non-conductive portion 200 is a single unitary piece as shown in FIGS. 9 and 10. In other embodiments, non-conductive portion 200 is formed by a plurality of discrete pieces attached together.

In some embodiments, non-conductive portion 200 is a substantially rectangular prism as shown in FIGS. 9 and 10. In other embodiments, non-conductive portion 200 has a non-rectangular prism shape.

Non-conductive portion 200 is made of one or more non-conductive materials. Exemplary non-conductive materials include non-conductive polymers (e.g., polyvinyl chloride) and glass. In some embodiments, the non-conductive material(s) are rigid, inflexible materials.

RFID transponder 300 can be attached to a portion of non-conductive portion 200. Non-conductive portion 200 can electrically isolate RFID transponder 300 from conductive portion 102. RFID transponder 300 can be configured to store information and wirelessly transmit information to the sample processing instrument, in some embodiments. In some embodiments, RFID transponder 300 includes an antenna for transmitting and receiving signals, and an integrated circuit that stores the information about receptacle holder 10. An RFID reader (sometimes referred to as an interrogator) of the sample processing instrument can transmit and receive radio waves to receive information transmitted by RFID transponder 300.

RFID transponder 300 can use radio-frequency electromagnetic fields to transmit the information. For example, the RFID transponder 300 can use one or more of the following frequency ranges to transmit the information: (1) a low frequency range (e.g., about 125-134 kHz); (2) a high frequency range (e.g., about 13.56 MHz), and (3) an ultra-high frequency range (e.g., about 433 MHz or about 856-960 MHz).

In some embodiments, RFID transponder 300 can be a label having an RFID inlay adhered to the label, and the label can be adhered to non-conductive portion 200, thereby coupling RFID transponder 300 to non-conductive portion 200. In some RFID inlay embodiments, RFID transponder 300 can include (a) a polymer substrate (e.g., a PET substrate) having an adhesive layer for adhering directly to non-conductive portion 200, (b) an antenna (e.g., made of aluminum) coupled to the PET substrate, (c) the integrated circuit operatively coupled to the antenna, and (d) a face material layer (e.g., made of clear PET 12) covering the integrated circuit and the antenna. In some RFID inlay embodiments, RFID transponder 300 can have a thickness of about 100 μm to about 300 μm, a die-cut width of about 10 mm to about 30 mm, and a die-cut length of about 25 mm to about 45 mm. In some RFID inlay embodiments, the antenna has a width of about 10 mm to about 20 mm, and a length of about 25 mm to about 35 mm. In some RFID inlay embodiments, the integrated circuit of the RFID transponder 300 can be an ICODE SLIX IC chip, or any suitable chip for intelligent label applications. In some RFID inlay embodiments, the air interface protocol of RFID transponder 300 can be ISO 15693 compliant, ISO 18000-3, Mode 1 compliant, or compliant with any suitable interface protocol. In some RFID inlay embodiments, RFID transponder 300 can include at least about 1 k bit of memory. In some RFID inlay embodiments, the RFID transponder operates at about 13.56 MHz. An exemplary RFID inlay can include SMARTTRAC's MiniTrack Wet Inlay RFID tag.

In some embodiments in which RFID transponder 300 is disposed to non-conductive portion 200, RFID transponder 300 is not a metal-mount RFID transponder—RFID transponder 300 is not specifically configured to be disposed on a metal or conductive surface.

Again, at least a portion of RFID transponder 300 is disposed in recess 202 defined by non-conductive portion 200. And in some embodiments, the RFID transponder 300 is disposed entirely in recess 202 of non-conductive portion 200. As such, recess 202 and the surrounding surface(s) of non-conductive portion 200 bounding recess 202 can collectively protect RFID transponder 300 by reducing the risk of RFID transponder snagging on or being interfered with any component of the sample processing instrument.

The information stored on RFID transponder 300 and transmittable to the sample processing instrument includes, for example, information about receptacle holder 10. Exemplary information can include one or more of the following: (1) a receptacle identifier that identifies each receptacle 400 supported by receptacle holder 10; (2) a holder identifier that identifies holder 10; and (3) a process identifier that identifies the processes (e.g., a test) to be performed using fluids contained in fluid-containing receptacles 400 supported by receptacle holder 10. In some embodiments, the receptacle identifier, the holder identifier, or both, each have a known association with the process to be performed using fluid contained in the respective fluid-containing receptacles 400 supported by receptacle holder 10. In some embodiments, the transmitted information indicates that the processes to be performed using fluids contained in fluid-containing receptacles 400 supported by receptacle holder 10 are for NAATs.

Figure 12A:
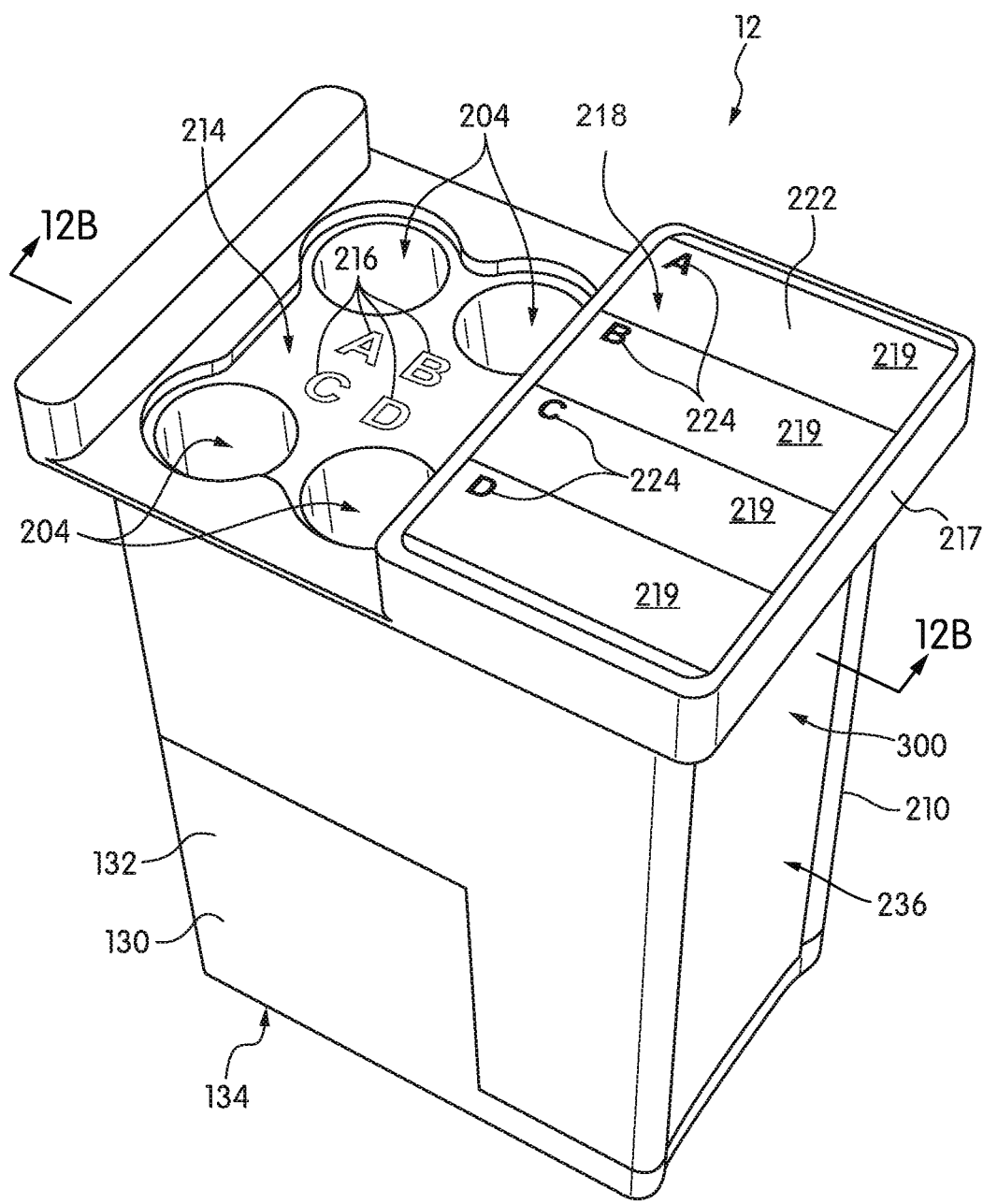
FIG. 12A is a perspective view of an exemplary receptacle holder, according to another embodiment.
Figure 12B:
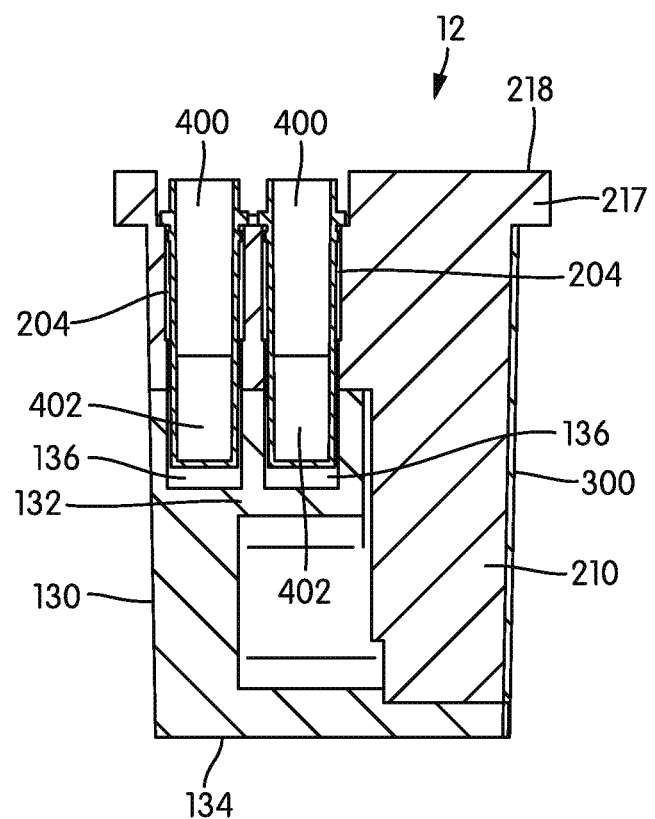
FIG. 12B is a cross-sectional view of the receptacle holder taken along line 12B-12B in FIG. 12A, according to an embodiment.

In some embodiments, the one or more recesses, which receive fluid-containing receptacles 400, are defined collectively by a conductive portion and a non-conductive portion. FIGS. 12A and 12B illustrate an embodiment of a receptacle holder 12 in which one or more receptacle-receiving channels 204 are collectively defined by a conductive portion 130 and a non-conductive portion 210 attached to conductive portion 130. RFID transponder 300, as described above, can be disposed on non-conductive portion 210.

Receptacle holder 12 is configured to support one or more fluid-containing receptacles and to transmit information about holder 12 to the sample processing instrument that uses the contained fluid. Receptacle holder 12 is also configured to allow for capacitive fluid level sensing.

As shown in FIGS. 12A and 12B, non-conductive portion 210 can have an inverted L-shape that defines the top portion of holder 12 in some embodiments. Non-conductive portion 210 defines one or more channels 204 each configured to receive a corresponding fluid-containing receptacle 400. Channels 204 extend entirely through the top portion of non-conductive portion 210, as best seen in FIG. 12B. As shown in FIG. 12A, non-conductive portion 210 can define four channels 204 arranged in a rectangular configuration. Although non-conductive portion 210 of FIGS. 12A and 12B defines four channels 204 in a rectangular configuration, non-conductive portion 210 can define more or less than four channels 204, and channels 204 can be arranged in non-rectangular configurations, for example, circular or linear configurations.

In some embodiments, channels 204 are configured (e.g., sized and shaped) such that, when a corresponding fluid-containing receptacle 400 is received in a respective channel 204, a top portion of fluid-containing receptacle 400 extends above non-conductive portion 210, and a closed end, bottom portion 402 of the fluid-containing receptacle 400 extends below non-conductive portion 210. The closed end, bottom portion 402 of the fluid-containing receptacle 400 that extends below non-conductive portion 210 extends into a axially-aligned recess 136 defined by conductive portion 130, which is described further below.

Conductive portion 130 defines recesses 136 (shown in FIG. 12B) that correspond to each channel 204. Recesses 136 are axially aligned with channels 204. Recess 136 can be configured similar to the bottom portion of recess 104 in the embodiments described above with reference to FIGS. 1-11. Conductive portion 130 also includes a portion configured to be electrically coupled to an electrical ground or voltage source of the sample processing instrument, which is separate from receptacle holder 12. For example, in some embodiments, this portion is a bottom portion 134 of conductive portion 130. As best seen in FIG. 12B, bottom portion 134 is electrically coupled to a receptacle-coupling portion 132 that is adjacent fluid-containing receptacles 400 when received with respective channels 204 and is capacitive coupled to fluid in fluid-containing receptacles 400. For example, receptacle-coupling portion 132 defines recesses 136. Bottom portion 134 and receptacle-coupling portion 132 can be integral components of a single-piece conductive portion 130, and bottom portion 134 is electrically coupled to receptacle-coupling portion 132 due to this integral nature. In other embodiments (not shown), bottom portion 134 and adjacent receptacle-coupling portion 132 are discrete components that are attached to each other, or are attached indirectly via another conductive component therebetween. In other embodiments, the portion of conductive portion 130 that is configured to be electrically coupled to an electrical ground or voltage source of the sample processing instrument is on a lateral side surface of conductive portion 130 instead of on bottom portion 134.

Conductive portion 130 is made of one or more conductive materials, for example, conductive metals. In some embodiments, the conductivity of the material(s) composing conductive portion 130 is greater than $1.0\times10^6$ (S/m) at 20° C. In some embodiments, the conductivity of the material(s) composing conductive portion 130 is less than $1.0\times10^6$ (S/m) at 20° C. Exemplary conductive metals include aluminum, silver, copper, gold, zinc, brass, bronze, iron, platinum, steel, stainless steel, or any other suitable metal. In some embodiments, the exterior surface of conductive portion 130 includes a corrosion resistant conversion coating. For example, the corrosion resistance conversion coating can be a chromate conversion coating (also referred to as a chemical film or chem film), such as a Class 1A film in some embodiments.

In some embodiments, each channel 204 has similar dimensions (i.e., each channel 204 is similarly sized and shaped), and each recess 136 has similar dimensions (i.e., each recess 136 is similarly sized and shaped). In such embodiments, channels 204 and recesses 136 can receive similarly dimensioned fluid-containing receptacles 400. In other embodiments (not shown), two or more of channels 204 have different dimensions (i.e., two or more channels 204 are sized and shaped differently), and two or more recesses 136 have different dimensions (i.e., two or more recesses 136 are sized and shaped differently). In such embodiments, channels 204 and recesses 136 can receive fluid-containing receptacles that have different dimensions.

Channels 204 and recesses 136 can be substantially cylindrical in some embodiments as shown in FIGS. 12A and 12B. In other embodiments, channels 204 and recesses 136 can have other shapes, for example, conical, frusta-conical, rectangular, or any other suitable shapes.

In some embodiments, the shape of channels 204 and recesses 136 (which can be substantially cylindrical and substantially conical, respectively) conforms to the shape of fluid-containing receptacles 400 (which can have an upper substantially cylindrical portion and a lower substantially conical closed portion). As best seen in FIG. 12B, each channel 204 and recess 136 can be dimensioned similar to the dimensions of the respective receptacle 400 to be received therein. That is, the shape and size of channels 204 recesses 136 can substantially conform to the shape and size of respective receptacles 400.

In other embodiments (not shown), each channel 204 and recess 136 can be dimensioned different than the dimensions of the respective receptacle 400 to be received therein. That is, the shape and size of recesses 104 does not substantially conform to the shape and size of respective receptacles 400.

In some embodiments, each pairing of channel 204 and recess 136 is configured such that closed end 402 of the respective fluid-containing receptacle 400 is adjacent to receptacle-coupling portion 132 of conductive portion 130. For example, in some embodiments (not shown), closed end 402 contacts adjacent receptacle-coupling portion 132 of conductive portion 130 when receptacle 400 is received within respective channel 204 and recess 136. And for example, in some embodiments (as shown in FIG. 12B), closed end 402 is spaced apart from adjacent receptacle-coupling portion 132 of conductive portion 130 when receptacle 400 is received within respective channel 204 and recess 136, but still close enough to allow for capacitive coupling between a fluid contained within receptacle 400 and adjacent receptacle-coupling portion 132 of conductive portion 130.

Openings of channels 204 are defined by a surface 214 of non-conductive portion 210. As shown in FIGS. 12A and 12B, surface 214 can be a top surface of non-conductive portion 210. Channels 204 extend downward from surface 214 in some embodiments. Accordingly, receptacles 400 can have a vertical orientation when received within respective channels 204.

In some embodiments, non-conductive portion 210 also includes recess-identifying indicators 216, which can have similar structure and function as any of the above described embodiments of indicators 114.

In some embodiments, non-conductive portion 210 includes a surface 218 configured to receive a user-provided indicator of a process (e.g., a test) to be performed using fluid in fluid-containing receptacles 400 received within channels 204 and recesses 136. Surface 218 can have a similar structure and function as any of the above described embodiments of surface 118, in some embodiments. Accordingly, in some embodiments, surface 218 includes a plurality of dedicated areas 219, which can be similar to dedicated areas 119 described above. Areas 219 can include recess-identifying indicators 224, which can be similar to indicators 122.

In some embodiments, surface 218 is part of a label 222 affixed to a indicia-receiving portion 217 of non-conductive portion 210. For example, indicia-receiving portion 217 that receives label 222 extends (1) upward from surface 214 defining the openings of channels 204 and (2) outwardly from surface 214. Accordingly, surface 218 is easily accessible to a user, allowing a user to provide the user-provided indicator of a process (e.g., test name) to be performed using fluid in fluid-containing receptacles 400 received within channels 204. Indicia-receiving portion 217 and surface 218 can be located at the top portion of non-conductive portion 210, in some embodiments. In other embodiments (not shown), surface 218 can be located on a lateral surface of non-conductive portion 210. In some embodiments, surface 218 is integrally formed into portion 220.

Although not shown in FIGS. 12A and 12B, conductive portion 130 or non-conductive portion 210 can include one of a key-way or a key that corresponds to the other of the key-way or the key on the sample processing instrument to ensure proper orientation within the instrument.

RFID transponder 300 can be attached to a portion of non-conductive portion 210. Non-conductive portion 210 can electrically isolate RFID transponder 300 from conductive portion 130.

In some embodiments, non-conductive portion 210 defines a recess 236, similar to recess 202 described above with reference to FIGS. 1-11. Recess 236 is configured to receive at least a portion of RFID transponder 300. RFID transponder 300 can be attached to the surface that defines recess 236. In some embodiments, recess 236 is configured to receive the entire RFID transponder 300. That is, the depth of recess 236 is equal to or greater than the corresponding thickness of RFID transponder 300. In such embodiments, no portion of RFID transponder 300 extends outwardly beyond one or more surfaces of non-conductive portion 210 surrounding recess 236. For example, when viewed from either side, RFID transponder 300 is not visible in some embodiments. Accordingly, RFID transponder 300 is unlikely to snag on or interfere with any component of the sample processing instrument.

Non-conductive portion 210 is attached to conductive portion 130. For example, non-conductive portion 210 can be fastened to conductive portion 130 in some embodiments. In other embodiments, non-conductive portion 210 is attached to conductive portion 130 using adhesive or an interference or press fit.

In some embodiments, non-conductive portion 210 is a single unitary piece as shown. In other embodiments, non-conductive portion 210 is formed by a plurality of discrete parts attached together.

Non-conductive portion 210 is made of one or more non-conductive materials. Exemplary non-conductive materials include non-conductive polymers (e.g., polyvinyl chloride) and glass. In some embodiments, the non-conductive material(s) are rigid, inflexible materials.

RFID transponder 300 that is attached to non-conductive portion 230 can have similar structure or function as described above with reference to FIGS. 1-11.

Figure 13:
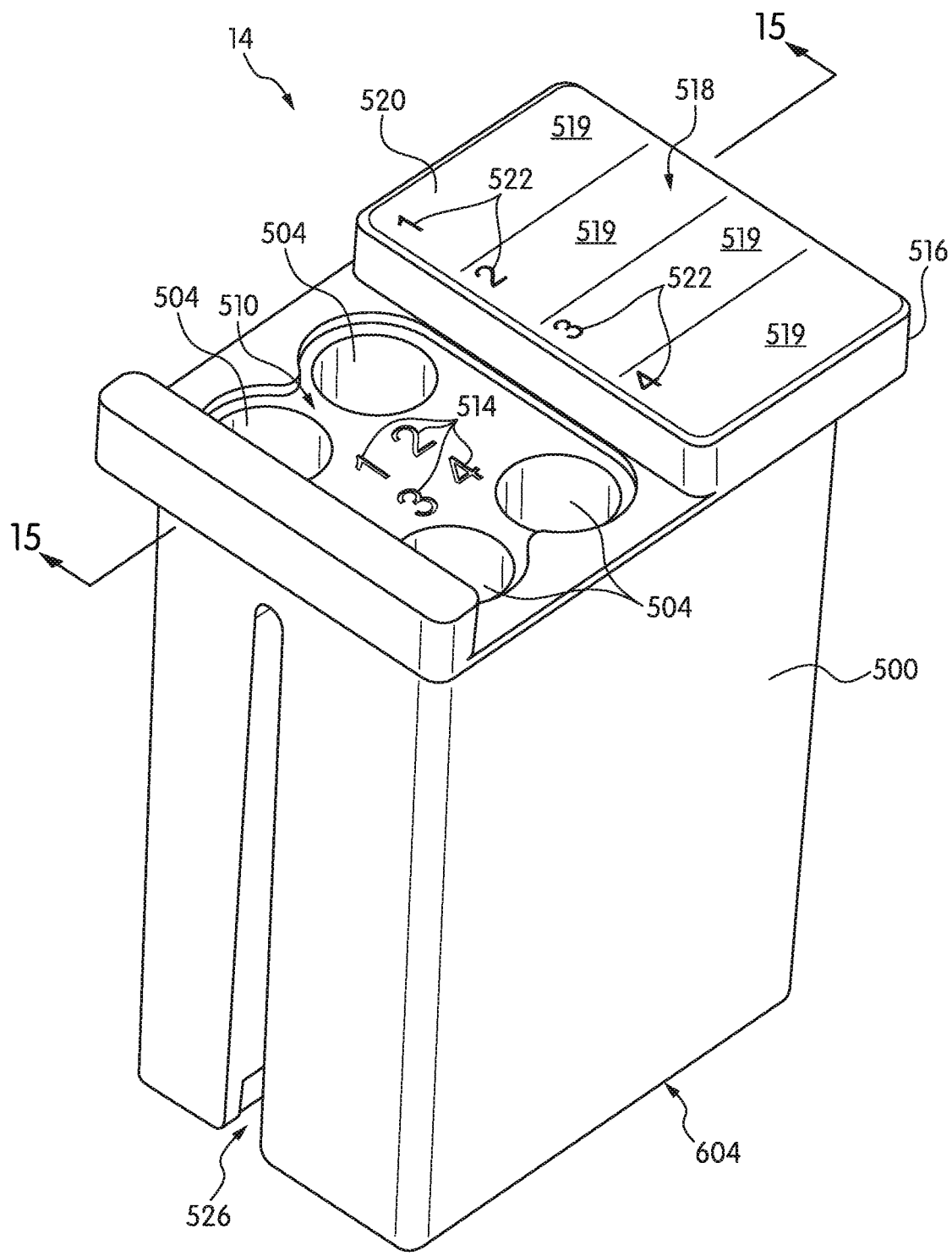
FIG. 13 is a top perspective view of an exemplary receptacle holder, according to another embodiment.
Figure 14:
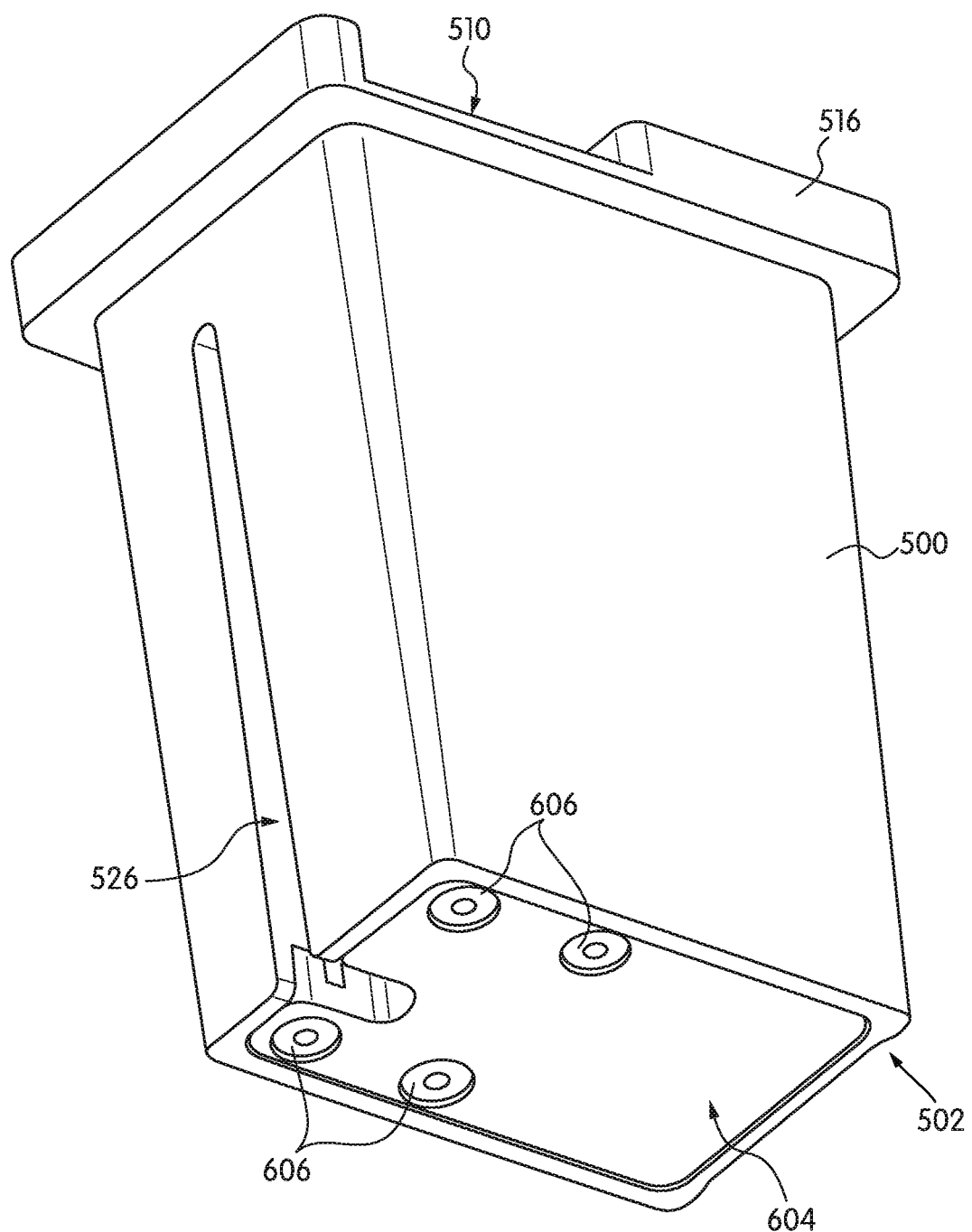
FIG. 14 is a bottom perspective view of the receptacle holder of FIG. 13, according to an embodiment.
Figure 15:
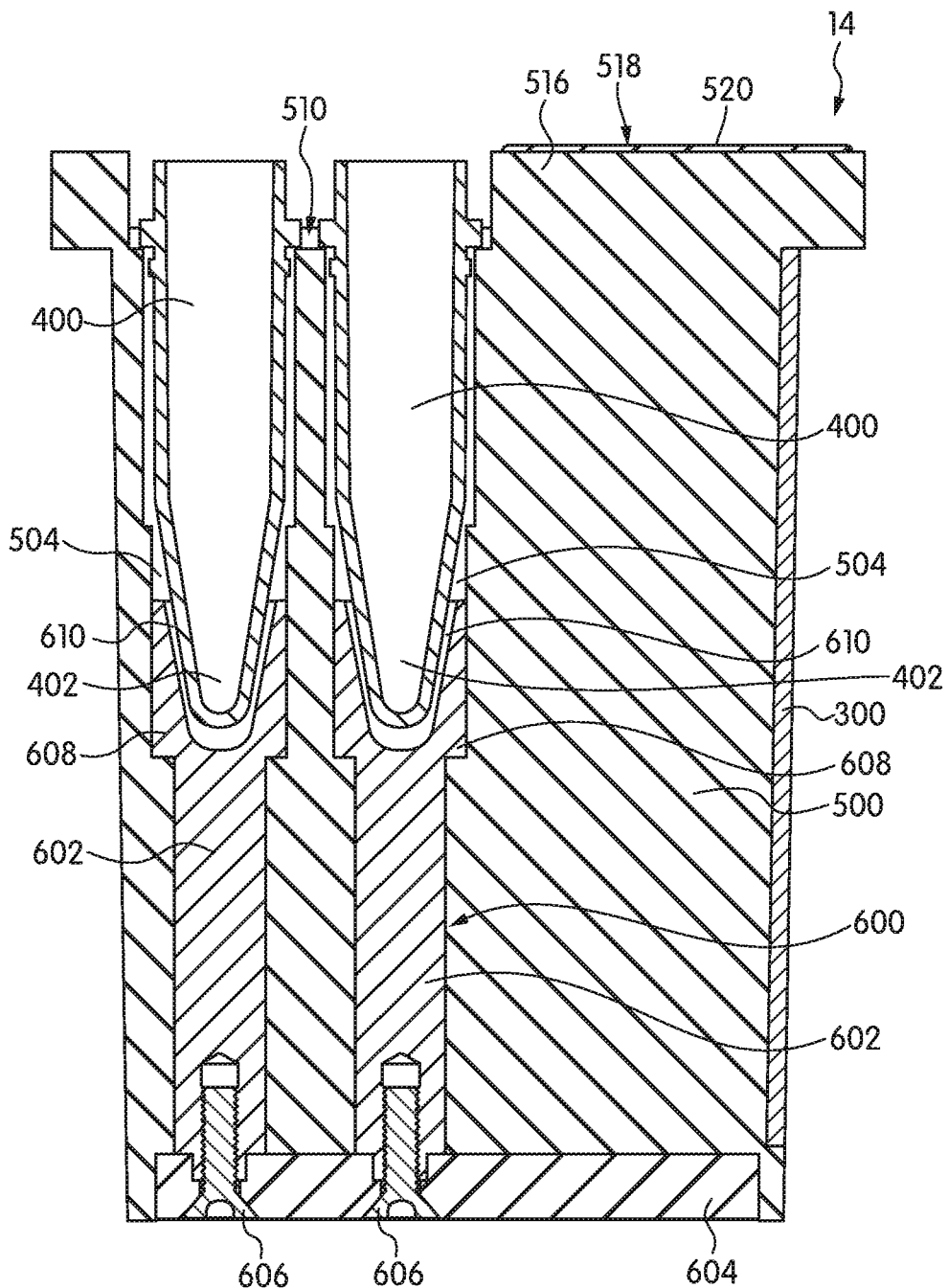
FIG. 15 is a cross-sectional view of the receptacle holder taken along line 15-15 in FIG. 13, according to an embodiment.

FIGS. 13-15 illustrate another embodiment of receptacle holder 14 in which the one or more recesses that receive fluid-containing receptacles 400 are defined collectively by a conductive portion and a non-conductive portion. Holder 14 includes a non-conductive portion 500, and one or more electrical conductors 600 attached to non-conductive portion 500. RFID transponder 300, as described above, can be disposed on non-conductive portion 500.

Receptacle holder 14 is configured to support one or more fluid-containing receptacles 400 and to transmit information about holder 14 to the sample processing instrument. For example, receptacle holder 14 can be configured to securely support one or more fluid-containing receptacles 400 within a sample processing instrument. Receptacle holder 14 is also configured to allow for capacitive fluid level sensing.

Non-conductive portion 500 can define one or more recesses 504 each configured to receive a corresponding fluid-containing receptacle 400. As best seen in FIG. 13, non-conductive portion 500 can define four recesses 504 arranged in a rectangular configuration. Although non-conductive portion 500 of FIGS. 13-15 defines four recesses 504 arranged in a rectangular configuration, non-conductive portion 500 can define more or less than four recesses 504, and recesses 504 can be arranged in non-rectangular configurations, for example, circular arrays.

As best seen in FIG. 15, each recess 504 is configured to receive a respective fluid-containing receptacle 400. In some embodiments, each recess 504 has similar dimensions (i.e., each recess 504 is similarly sized and shaped). In such embodiments, recesses 504 can each receive similarly dimensioned fluid-containing receptacles 400. In other embodiments (not shown), two or more of recesses 504 have different dimensions (i.e., two or more recesses 504 are sized and shaped differently). In such embodiments, recesses 504 can receive fluid-containing receptacles that have different dimensions. As shown in FIGS. 13-15, recesses 504 can be substantially cylindrical in some embodiments. In other embodiments (not shown), recesses 504 can have other shapes, for example, frusta-conical, rectangular, or any other suitable shape.

In some embodiments, each recess 504 is configured such that a closed end 402 of a respective fluid-containing receptacles 400 is adjacent to an electrically conductive portion 608 of conductor 600. In some embodiments (not shown), closed end 402 contacts adjacent portion 608 of conductor 600 when receptacle 400 is received within a respective recess 504. In some embodiments (as best seen in FIG. 15), closed end 402 is spaced apart from adjacent portion 608 of conductor 600 when receptacle 400 is received within a respective recess 504, but still close enough to allow for capacitive coupling between a fluid contained within receptacle 400 and adjacent portion 608 of conductor 600.

Openings of recesses 504 are defined by a surface 510 of non-conductive portion 500. As shown in FIG. 13, surface 510 can be a top surface of non-conductive portion 500. Recesses 504 extend downward from surface 510 in some embodiments. Accordingly, receptacles 400 have a vertical orientation when received within respective recesses 504.

In some embodiments, recesses 504 conform to the shape of fluid-containing receptacles 400. For example, as best seen in FIG. 15, each recess 504 can be dimensioned similar to the dimensions of the respective receptacle 400 to be received therein. That is, the shape and size of recesses 504 can substantially conform to the shape and size of respective receptacles 400.

In other embodiments (not shown), each recess 504 can be dimensioned different than the dimensions of the respective receptacle 400 to be received therein. That is, the shape and size of recesses 504 does not substantially conform to the shape and size of respective receptacles 400.

In some embodiments, non-conductive portion 500 also includes recess-identifying indicators 514, which can have similar configurations and functions as indicators 114 described above with reference to FIGS. 1-11.

In some embodiments, non-conductive portion 500 includes a surface 518 configured to receive a user-provided indicator of a process (e.g., a test) to be performed using fluid in fluid-containing receptacles 400 received within recesses 504. Surface 518 can have similar configurations and functions as surface 118 described above with reference to FIGS. 1-11, in some embodiments. For example, surface 518 can include a plurality of dedicated areas 519 configured to receive the user-provided indicator for each fluid-containing receptacle 400 received within respective recesses 504, and each area 519 can include a recess-identifying indicators 522 are disposed on surface 518. Recess-identifying indicators 522 can have similar configurations and functions as indicators 122 described above with reference to FIGS. 1-11.

In some embodiments, surface 518 is part of a label 520 affixed to a indicia-receiving portion 516 of non-conductive portion 500. Indicia-receiving portion 516 that receives label 520 extends (1) upward from surface 510 defining the openings of recesses 504 and (2) outwardly from surface 510. Accordingly, surface 518 is easily accessible to a user, allowing a user to provide the user-provided indicator of a process (e.g., test) to be performed using fluid in fluid-containing receptacles 400 received within recesses 504. Indicia-receiving portion 516 and surface 518 can be located at the top portion of non-conductive portion 500, in some embodiments. In other embodiments (not shown), surface 518 can be located on a lateral side surface of non-conductive portion 500. In some embodiments, surface 518 is integrally formed into indicia-receiving portion 516.

Non-conductive portion 500 can include one of a key-way or a key that corresponds to the other of the key-way or the key on the sample processing instrument. For example, as best seen in FIG. 13, non-conductive portion 500 can define key-way 526, which can be similarly configured and functions similar to key-way 126 described above with reference to FIGS. 1-11.

Non-conductive portion 500 is made of one or more non-conductive materials. Exemplary non-conductive materials include non-conductive polymers (e.g., polyvinyl chloride) and glass. In some embodiments, the non-conductive material(s) are rigid, inflexible materials.

In some embodiments, non-conductive portion 500 is a single unitary piece as shown in FIGS. 13-15. In other embodiments, non-conductive portion 500 is formed by a plurality of discrete parts attached together.

Conductor 600 is configured to electrically couple fluid within respective receptacles 400 within recess 504 to an electrical ground or voltage source of the sample processing instrument, which is separate from receptacle holder 14. Conductor 600 is disposed within non-conductive portion 500 in some embodiments as shown in FIGS. 13-15. Conductor 600 includes an electrically conductive portion 608 for each recess 504. Each portion 608 can be disposed in a bottom portion of a respective recess 504 as best seen in FIG. 15. Each portion 608 can define a recess 610 axially aligned with a respective recess 504 of non-conductive portion 500. Each recess 610 can be configured to receive a portion, for example, the closed end, bottom portion 402 of the fluid-containing receptacle 400 received within recess 504, such that conductive portion 608 is capactively coupled to fluid within a respective receptacle 400.

In some embodiments, each recess 610 has similar dimensions (i.e., each recess 610 is similarly sized and shaped). In such embodiments, recesses 610 can each receive similarly dimensioned fluid-containing receptacles 400. In other embodiments (not shown), two or more of recesses 610 have different dimensions (i.e., two or more recesses 610 are sized and shaped differently). In such embodiments, recesses 610 can receive fluid-containing receptacles that have different dimensions. As shown in FIG. 15, recesses 610 can be substantially conical in some embodiments. In other embodiments (not shown), recesses 610 can have other shapes, for example, cylindrical, frusta-conical, rectangular, or any other suitable shape. The shape of recesses 610 can conform to the shape of closed ends 402 of fluid-containing receptacles 400.

In some embodiments, conductive portions 608 are electrically coupled to a portion of electrical conductor 600 configured to be electrically coupled to an electrical ground or voltage source of the sample processing instrument, which is separate from receptacle holder 14. For example, in some embodiments, electrical conductor 600 includes a bottom portion 604, which can define a bottom, exterior surface of receptacle holder 14, that is configured to be coupled to electrical ground or voltage source of the sample processing instrument. In other embodiments, the portion of electrical conductor 600 configured to be electrically coupled to an electrical ground or voltage source of the sample processing instrument forms a lateral side surface of receptacle 14.

Conductive portions 608 adjacent closed end portions 402 of receptacles 400 can be electrically coupled to bottom portion 604. For example, each conductive portion 608 can be coupled to bottom portion 604 via, for example, an intermediate portion 602 extending from portion 608. Intermediate portion 602 can be integral with or discrete from portion 608. And intermediate portion 602 is electrically coupled to bottom portion 604. As shown in FIG. 15, intermediate portions 602 are discrete from bottom portion 604, and intermediate portions 602 can be fastened together with bottom portion 604 using ore more fasteners 606.

In other embodiments, portion 608, intermediate portion 602, and bottom portion 604 can compose a single unitary piece.

Conductor 600, including portions 602, 604, and 608, is made of one or more conductive materials, for example, conductive metals. In some embodiments, the conductivity of the material(s) composing conductor 600 is greater than $1.0 \times 10^6$ (S/m) at 20° C. In some embodiments, the conductivity of the material(s) composing conductor 600 is less than $1.0 \times 10^6$ (S/m) at 20° C. Exemplary conductive metals include aluminum, silver, copper, gold, zinc, brass, bronze, iron, platinum, steel, stainless steel, or any other suitable metal.

In some embodiments, any exterior defining surfaces of conductor 600 (for example, the exterior surface of bottom portion 604) includes a corrosion resistant conversion coating. For example, the corrosion resistant conversion coating can be a chromate conversion coating (also referred to as a chemical film or chem film), such as a Class 1A film, in some embodiments.

Receptacle holder 14 also includes RFID transponder 300, which can be attached to a portion of non-conductive portion 500. Non-conductive portion 500 can electrically isolate RFID transponder 300 from electrical conductor 600.

In some embodiments, non-conductive portion 500 defines a recess 502 configured to receive at least a portion of RFID transponder 300. Recess 502 can be defined by a lateral side surface of non-conductive portion 500. RFID transponder 300 can be attached to the surface defining recess 502 in some embodiments. In some embodiments, recess 502 is configured to receive the entire RFID transponder 300. That is, a depth of recess 502 is equal to or greater than the corresponding thickness of RFID transponder 300. In such embodiments, no portion of RFID transponder 300 extends outwardly beyond a surface of non-conductive portion 500. Accordingly, RFID transponder 300 is unlikely to snag on or interfere with any component of the sample processing instrument.

Receptacle holders 10, 12, and 14 according to any of the above described embodiments can minimize any interference to the information transmitted from RFID transponder 300 to the sample processing instrument due to RFID transponder 300 being coupled to the respective non-conductive portions. Receptacle holders 10, 12, and 14 according to any of the above described embodiments also allow for capacitive fluid level detection sensing as described below.

Exemplary Sample Processing Instrument Using Receptacle Holders

Any of the above described embodiments of receptacle holders 10, 12, and 14 can be used by a sample processing instrument to process a sample. Exemplary sample processing instruments can include, for example, a nucleic acid analyzer, such as the Tigris®, Panther®, or Panther Fusion® systems sold by Hologic, Inc. that are configured to simultaneously perform multiple NAATs. However, a nucleic acid analyzer is only exemplary, and embodiments of the current disclosure can be used in any application and with any instrument that processes and/or analyzes samples.

Figure 16A:
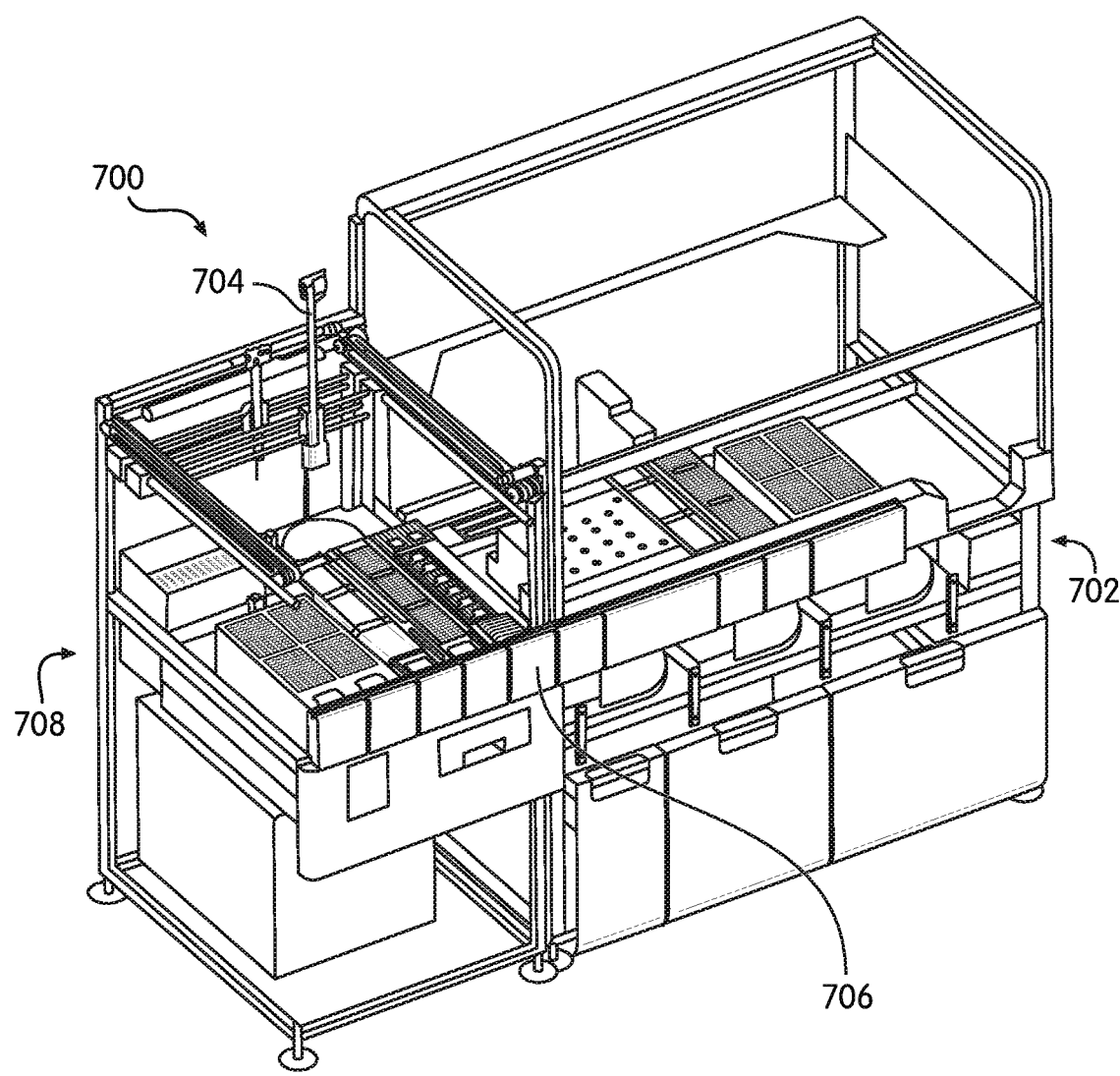
FIG. 16A is a perspective view of an exemplary sample processing instrument with portion of the housing and other components removed for illustrative purposes, according to an embodiment.

FIG. 16A illustrates an exemplary sample processing instrument 700, according to an embodiment. In some embodiments, sample processing instrument 700 can be configured to perform a plurality of different analyses (e.g., different molecular assays) on a plurality of samples. In some embodiments, sample processing instrument 700 can be configured to perform different target nucleic acid amplification reactions on different samples. For example, a plurality of samples can be loaded on, or in, sample processing instrument 700, and sample processing instrument 700 can perform a first process (e.g., a first assay involving a first target nucleic acid amplification reaction) on a first subset of a plurality of samples, and perform a different process (e.g., a second assay involving a second target nucleic acid amplification reaction different than the first target nucleic acid amplification reaction) on a second subset of the plurality of samples. In some embodiments, sample processing instrument 700 is configured to perform one NAAT on a first subset of a plurality of samples, and different NAAT on a second subset of the plurality of samples. The NAATs may differ in terms of NAAT type (e.g., PCR versus an isothermal amplification reaction), the temperature profiles of the two amplifications, and/or the targeted nucleic acids.

In some embodiments, sample processing instrument 700 can be any one of the instrument embodiments described in U.S. Provisional Appl. No. 62/480,977, filed Apr. 3, 2017.

In some embodiments, sample processing instrument 700 can have a modular structure and be composed of a plurality of modules operatively coupled together. For example, sample processing instrument 700 can include a first module 702 and a second module 708 operatively coupled together. Both first module 702 and second module 708 can be configured to perform one or more steps of the first process and/or the second process. In some embodiments, first and second modules 702 and 708 can be separate modules selectively coupled together. That is, first module 702 can be selectively and operatively coupled to one second module 708, and first module 702 can be selectively decoupled from second module 708 and coupled to a different second module 708. First and second modules 702 and 708 can be coupled together by any method. For example, fasteners (for example, bolts or screws), clamps, belts, straps, or any combination of fastening/attachment devices can be used to couple these modules together. In some embodiments, sample processing instrument 700 can be an integral, self-contained structure (that is, first module 702 cannot be decoupled from second module 708).

In some embodiments, power, data, and/or utility lines or conduits (air, water, vacuum, etc.) can extend between first and the second modules 702 and 708. In some embodiments, first module 702 is configured to perform first nucleic acid amplification reactions requiring isothermal conditions, i.e., substantially constant temperature, during the duration of the first nucleic acid amplification reactions (e.g., transcription-mediated amplification reactions (TMA), nucleic acid sequence based amplification (NASBA) reactions, and strand displacement amplification (SDA) reactions), and second module 708 is configured to perform second nucleic acid amplification reactions requiring thermal cycling (e.g., polymerase chain reactions (PCR)). In some embodiments, first module 702 can be a nucleic acid analyzer that was previously purchased by a customer, and second module 708 can be a later purchased module that expands the analytical capabilities of the combined system. For example, in an embodiment where sample processing instrument 700 is a Panther Fusion® system (from Hologic, Inc.), first module 702 can be a Panther® instrument configured to perform TMA assays of samples, and second module 708 can be a detachable module that is configured to extend the functionality of the Panther instrument by adding PCR assay capabilities.

An exemplary sample processing instrument 700 with exemplary first and second modules 702 and 708 is described in U.S. Patent Publication Numbers 2016/0060680 and 2016/0032358. Exemplary systems, functions, components, and capabilities of first and second modules 702 and 708 are described in the above-referenced publications and are not described herein for the sake of brevity. Among other components, first and/or second modules 702 and 708 can include compartments (e.g., drawers, cabinets, etc.) that can be opened and loaded with receptacles holding samples, receptacles storing reagents, receptacles for performing reactions involved in the analysis, etc. These compartments include at least one fluid drawer 706 that stores a plurality of fluid-containing receptacles (containing, for example, primers and probes) that are used during the sample processing.

The components of first and/or second modules 702 and 708 also include transporters for moving receptacles and/or holders between different load stations (heaters, incubators, etc.) of modules 702 and 708, and one or more fluid transfer devices 704 that transfer desired amounts of fluids between different receptacles within sample processing instrument 700. An exemplary fluid transfer device 704 can include a robotic pipettor configured for controlled, automated movement, between different locations (e.g., fluid drawer 706, sample-containing receptacles, reaction receptacles, and other fluid-containing receptacles (e.g., fluid reagent-containing receptacles) of modules 702 and 708. Each fluid transfer device 704 can include a probe 726 (shown in FIGS. 18 and 19). Probe 726 can be, for example, disposable pipette tip or an integral tip. Probe 726 can be configured to access fluid-containing receptacles, aspirate at least a portion of the fluid, and then dispense a desired amount of the aspirated fluid into another receptacle, for example, a reaction receptacle.

In some embodiments, fluid drawer 706 is configured to hold a plurality of fluid-containing receptacles. In some embodiments, fluid drawer 706 can be a part of second module 708. However, it is also contemplated that fluid drawer 706 can be a part of first module 702.

Fluid drawer 706 can include a movable frame 710 and a stationary support 712. Movable frame 710 can be movably coupled (for example, slidably) to stationary support 712 such that frame 710 can move relative to stationary support 712. Stationary support 712 can be integral with the frame of sample processing instrument 700 or coupled to the frame of sample processing instrument 700.

Figure 16B:
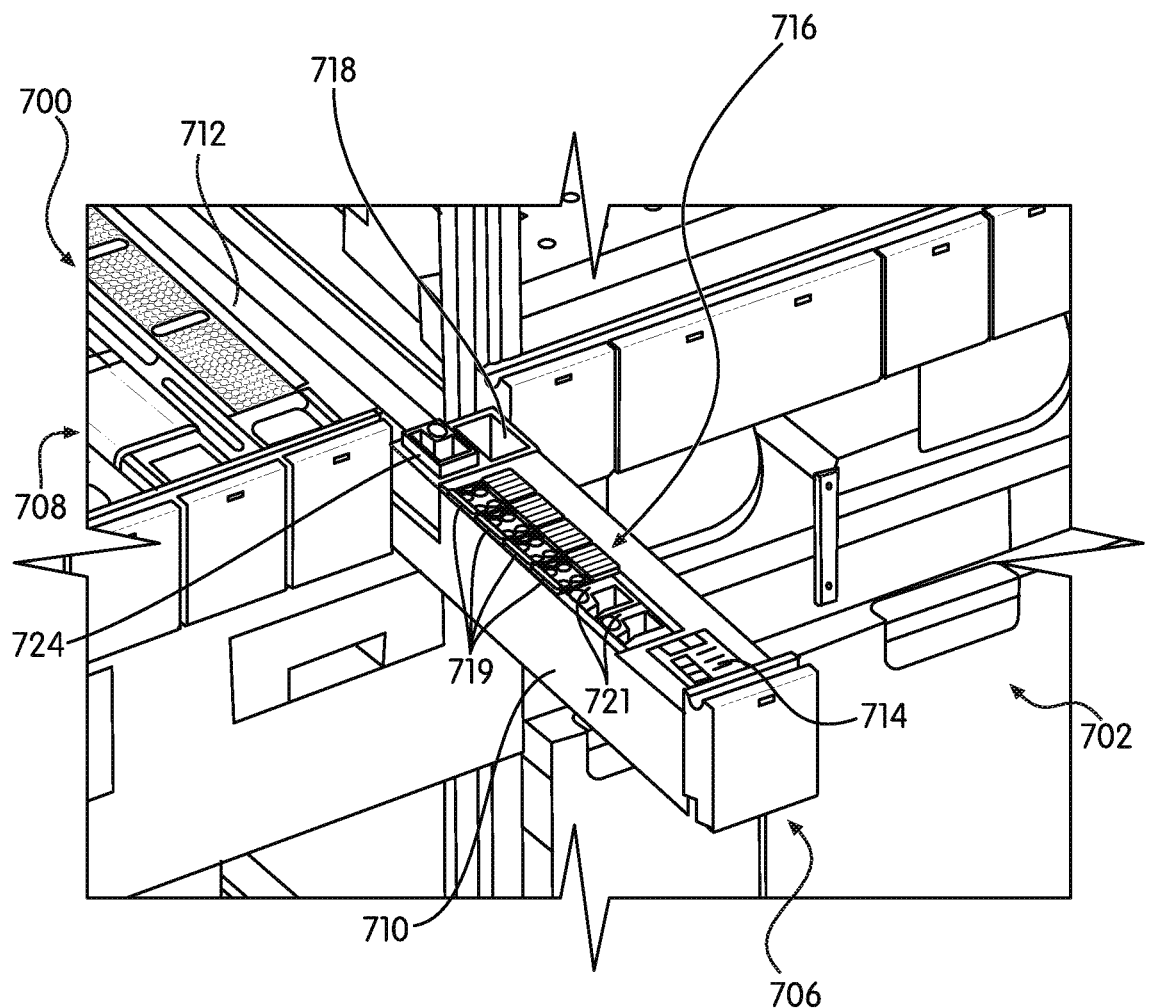
FIG. 16B is a perspective view of an exemplary fluid drawer of a sample processing instrument in an opened position, according to an embodiment.
Figure 17:
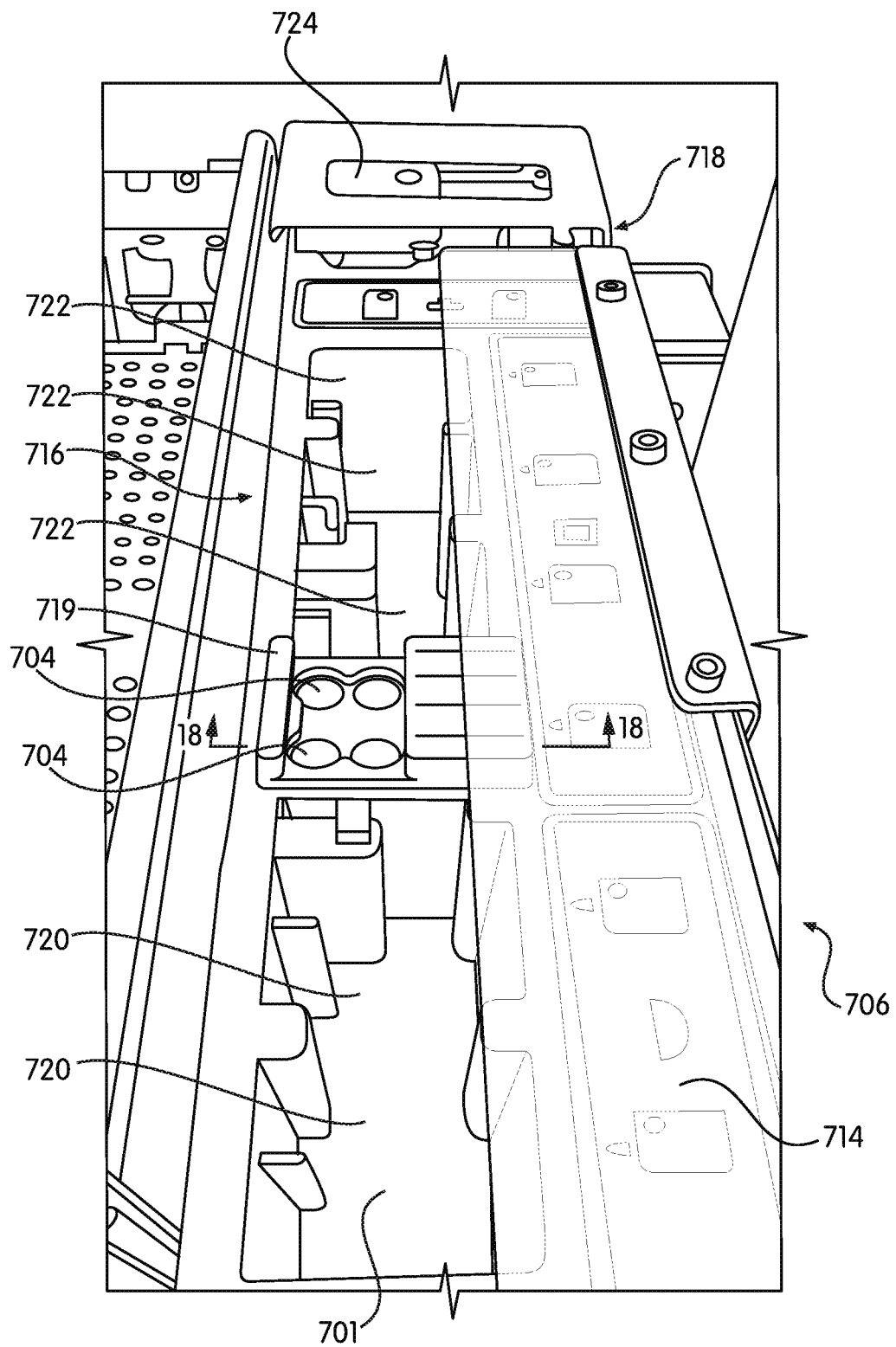
FIG. 17 is a front perspective view of an exemplary fluid drawer of a sample processing instrument in a closed position, according to an embodiment.

Frame 710 can move between a closed position in which frame 710 and the components supported thereby are within sample processing instrument 700 (as shown in FIGS. 16A and 17), and an opened position in which the components supported thereby are outside of processing instrument 700 and accessible to an operator (as shown in FIG. 16B). For example, an operator can pull on a cover panel of fluid drawer 706 (or the housing of second module 708) to slide frame 710 out from the closed position within instrument 700 to the opened position, thereby providing the operator access to the contents of fluid drawer 706. The door or cover panel can provide an esthetically pleasing appearance to the front of second module 708. Automated locks, controlled by the system controller, can be provided to prevent frame 710 of fluid drawer 706 from being pulled open when second module 708 is operating. In some embodiments, visible and/or audible warning signals can be provided to indicate that fluid drawer 706 is not closed properly.

FIG. 16B is an enlarged perspective view of a portion of sample processing instrument 700 with frame 710 of fluid drawer 706 at the opened position, according to an embodiment. FIG. 17 is a front perspective view of an exemplary fluid drawer 706 at the closed position and separated from the remainder of sample processing instrument 700. In the discussion below, reference will be made to both FIGS. 16B and 17. Frame 710 of fluid drawer 706 is configured to support one or more fluid-containing receptacles. For example, frame 710 can be configured to support one or more receptacle holders (for example, receptacle holders 10, 12, and 14 as described above) that are configured to hold one or more fluid-containing receptacles, which can carry different types of reagents.

In some embodiments, frame 710 of fluid drawer 706 is configured to support a plurality of receptacles, including both receptacles supported by a plurality of receptacle holders and receptacles not supported by receptacle holders. For example, frame 710 can be configured to support (a) one or more holders 718 (for example, one holder 718 as shown in FIGS. 16B and 17) that each support one or more fluid-containing receptacles 724, (b) one or more holders 719 (for example, four holders 719 as shown in FIG. 16B) that each support one or more fluid-containing receptacles 400, and (c) one or more fluid-containing receptacles 721 (for example, two fluid-containing receptacles 721 as shown in FIG. 16B).

Holder 718 can be configured to be selectively mounted to frame 710—holder 718 can be moved onto or off of frame 710 as desired. For example, holder 718 can be configured according to any one of the embodiments of the holders described in U.S. Provisional Appl. No. 62/480,977, filed Apr. 3, 2017. A transporter as described in U.S. Provisional Appl. No. 62/480,977 can move holder 718 from a position on frame 710 to another position within sample processing instrument 700. Holder 718 can define one or more recesses for receiving one or more elution buffer containing receptacles 724. For example, as shown in FIG. 16B, holder 718 can define two recesses each configured to receive a respective receptacle 724, and as illustrated in FIG. 16B, one receptacle 724 is seated within one of the two recesses defined by holder 718. When holder 718 is mounted to frame 710 and fluid-containing receptacles 724 are received in the recess defined by holder 718, fluid-containing receptacles 724 are operatively coupled to frame 710. In some embodiments, the one or more receptacles 724 supported by holder 718 contain one or more of a sample fluid, an oil, a reconstitution buffer used to reconstitute a dried reagent, an elution buffer, solid supports (e.g., magnetically-responsive particles or silica beads) for immobilizing and purifying analytes of interest, and reagents for performing a test or analytical procedure, such as primers, probes and enzymes used to perform a NAAT. For example, receptacles 724 can contain an elution buffer.

Each of holders 719 is a separate component, discrete from each other and from holder 718 and receptacles 721. Each holder 719 can be any one of the above described receptacle holder embodiments, for example, any embodiment of holders 10, 12, and 14 described above. And in some embodiments, the one or more receptacles 400 supported by holders 719 contain one or more of a sample fluid, an oil, a reconstitution buffer used to reconstitute a dried reagent, an elution buffer, solid supports (e.g., magnetically-responsive particles or silica beads) for immobilizing and purifying analytes of interest, and reagents for performing a test or analytical procedure, such as primers, probes and enzymes used to perform a NAAT. In some embodiments, each receptacle 400 supported by holders 719 contains a fluid different than the fluid(s) contained in receptacles 724.

Each of receptacles 721 is a separate component, discrete from each other and from holder 718 and holders 719. Each receptacle 721 is configured to be supported directly by frame 710 without using a receptacle holder. And in some embodiments, the one or more receptacles 721 contain one or more of a sample fluid, an oil, a reconstitution buffer used to reconstitute a dried reagent, an elution buffer, solid supports (e.g., magnetically-responsive particles or silica beads) for immobilizing and purifying analytes of interest, and reagents for performing a test or analytical procedure, such as primers, probes and enzymes used to perform a NAAT. In some embodiments, each receptacle 721 contains a fluid different than the fluid(s) contained in receptacles 724 and in receptacles 400 supported by holders 719.

In some embodiments, frame 710 includes a receptacle and holder receiving area 716 defining a plurality of recesses 722, each configured to receive a respective holder 719, and defining a plurality of recesses 720 each configured to directly receive a respective fluid-containing receptacle without a holder. Recesses 722 and 720 can be configured to align and/or support respective holders 719 and fluid-containing receptacles 721.

In some embodiments, the dimensions of recesses 722 and 720 are similar such that each can interchangeably receive receptacle holder 719 and receptacle 721. In such embodiments, the form factor of receptacles 721 can be substantially similar to the form factor of receptacle holders 719.

In some embodiments, the dimensions of recesses 722 and 720 are different such that recesses 720 can only receive receptacles 721, and recesses 722 can only receive receptacle holders 719. In such embodiments, the form factor of receptacles 721 may not be substantially similar to the form factor of receptacle holders 719.

Fluid drawer 706 can be configured to support any number of receptacle holders and to directly support (i.e., without using receptacle holders) any number of fluid-containing receptacles. The number and size of the receptacles in the receptacle-holders and the directly supported receptacles can be dictated by, among other things, considerations of intended throughput and desired time period between required re-stocking of supplies.

In some embodiments, drawer 706 includes an indicator panel 714 having visible signals (e.g., red and green LEDs) and/or other indicators (textual, audible, etc.) provided on frame 710 or in fluid drawer 706 (or on the holders) to provide feedback to the operator regarding holder and receptacle status within recesses 722. Indicator panel 714 can be positioned at any location in the fluid drawer 706 or on the receptacle holders (note different exemplary locations of indicator panels 714 in FIGS. 16B and 17).

In some embodiments, at least one surface of frame 710 defining each recesses 722 can be conductive and electrically coupled to an electrical ground or voltage source of sample processing instrument 700. For example, referencing FIG. 18, a surface 727 defining a bottom portion of recess 722 can be conductive and electrically coupled to an electrical ground or voltage source of sample processing instrument 700. Conductive surface 727 can be positioned such that when receptacle holder 719 is received within recess 722, a corresponding conductive portion of receptacle holder 719 (for example, bottom portion 112 of receptacles holder 10, bottom portion 134 of receptacle holder 12, or bottom portion 604 of receptacle holder 14) contacts or is adjacent to surface 727, thereby electrically coupling receptacle holder 719 (and fluid in contained in the one or more receptacles supported by receptacle holder 719) to the electrical ground or voltage source of sample processing instrument 700.

Conductive surface 727 is made of one or more conductive materials, for example, conductive metals, such that conductive surface 727 is electrically conductive. In some embodiments, the conductivity of the material(s) composing conductive surface 727 is greater than $1.0 \times 10^6$ (S/m) at 20° C. In some embodiments, the conductivity of the material(s) composing conductive surface 727 is less than $1.0 \times 10^6$ (S/m) at 20° C. Exemplary conductive metals include aluminum, silver, copper, gold, zinc, brass, bronze, iron, platinum, steel, stainless steel, or any other suitable metal. In some embodiments, surface 727 includes a conductive metal foil, a coated or painted layer of a conductive metal, or a conductive metal inserts.

Figure 18:
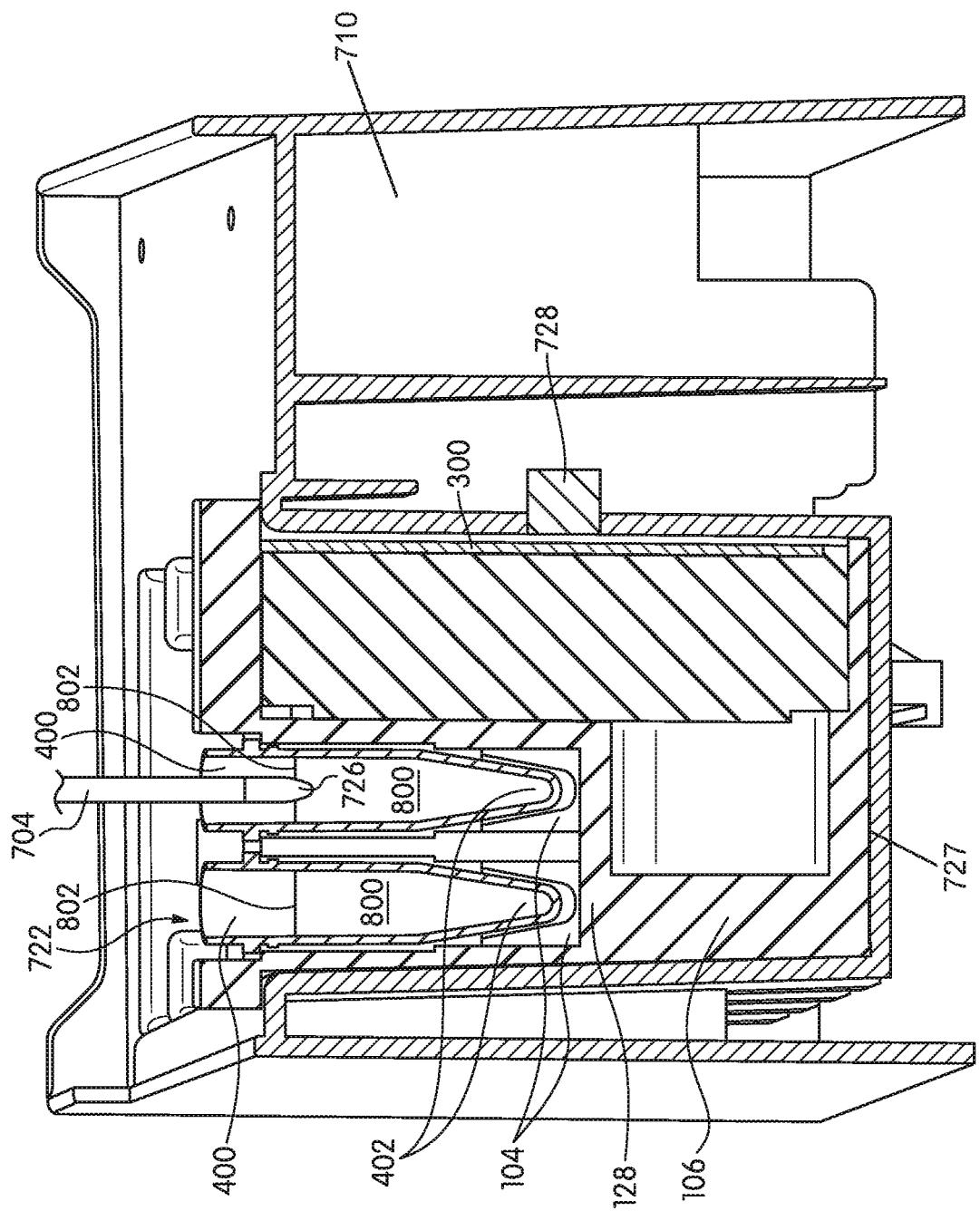
FIG. 18 is a cross-sectional view of a fluid drawer and an exemplary receptacle holder taken along line 18-18 in FIG. 17, according to an embodiment.

FIG. 18 illustrates an exemplary cross-sectional schematic view of receptacle holder 10, as described above, seated within recess 722 of frame 710 according to an embodiment. When receptacle holder 10 is seated within recess 722, conductive surface 727 of frame 710 contacts conductive surface of bottom portion 112 of holder 10. The conductive surface of bottom portion 112 is capacitively coupled to fluid 800 contained within receptacle 400 via conductive receptacle-coupling portion 128 adjacent closed end 402 of receptacle 400. This electrically coupling enables the formation of an electrically conductive plane or circuit around holder 10 that can be used for capacitive fluid level detection as described below.

In some capacitive fluid level detection embodiments and referencing FIG. 18, fluid transfer device 704 (e.g., a robotic pipettor) can be configured to detect the level of fluid 800 in receptacle 400 using capacitive level sensing (and, in some cases, other fluid level sensing or measurement techniques). A probe 726 (for example, a disposable pipette tip) of fluid transfer device 704 can be connected to a voltage source (e.g., an alternating voltage source) such that probe 726 serves as one conductor of a capacitor. The ground plane (e.g., the grounded electrically conductive plane formed on holder 10 by conductive portion 102, serves as the other conductor of the capacitor. The capacitance signal (a signal related to the capacitance) measured between these two capacitive conductors can be used to detect the fluid level in receptacle 400. In embodiments in which fluid 800 is conductive, when probe 726 contacts the fluid surface level 802 of fluid 800, an observable spike in the capacitance signal occurs. In use, as probe 726 of transfer device 704 moves downward toward fluid 800, the position (height) of the fluid transfer device 704 is monitored simultaneously along with the capacitance signal. When the capacitance signal increases rapidly (e.g., a spike caused by probe 726 contacting fluid 800), the height of the pipettor is recorded, thereby establishing the height of the fluid surface level 802. Since one conductor of the capacitor (i.e., top receptacle-coupling portion 128 of conductive portion 102) is positioned adjacent closed end 402 of receptacle 400, the measured capacitance signal is very sensitive to and, therefore, can be used to accurately detect the fluid level 802 of fluid 800 in receptacle 400.

Figure 19:
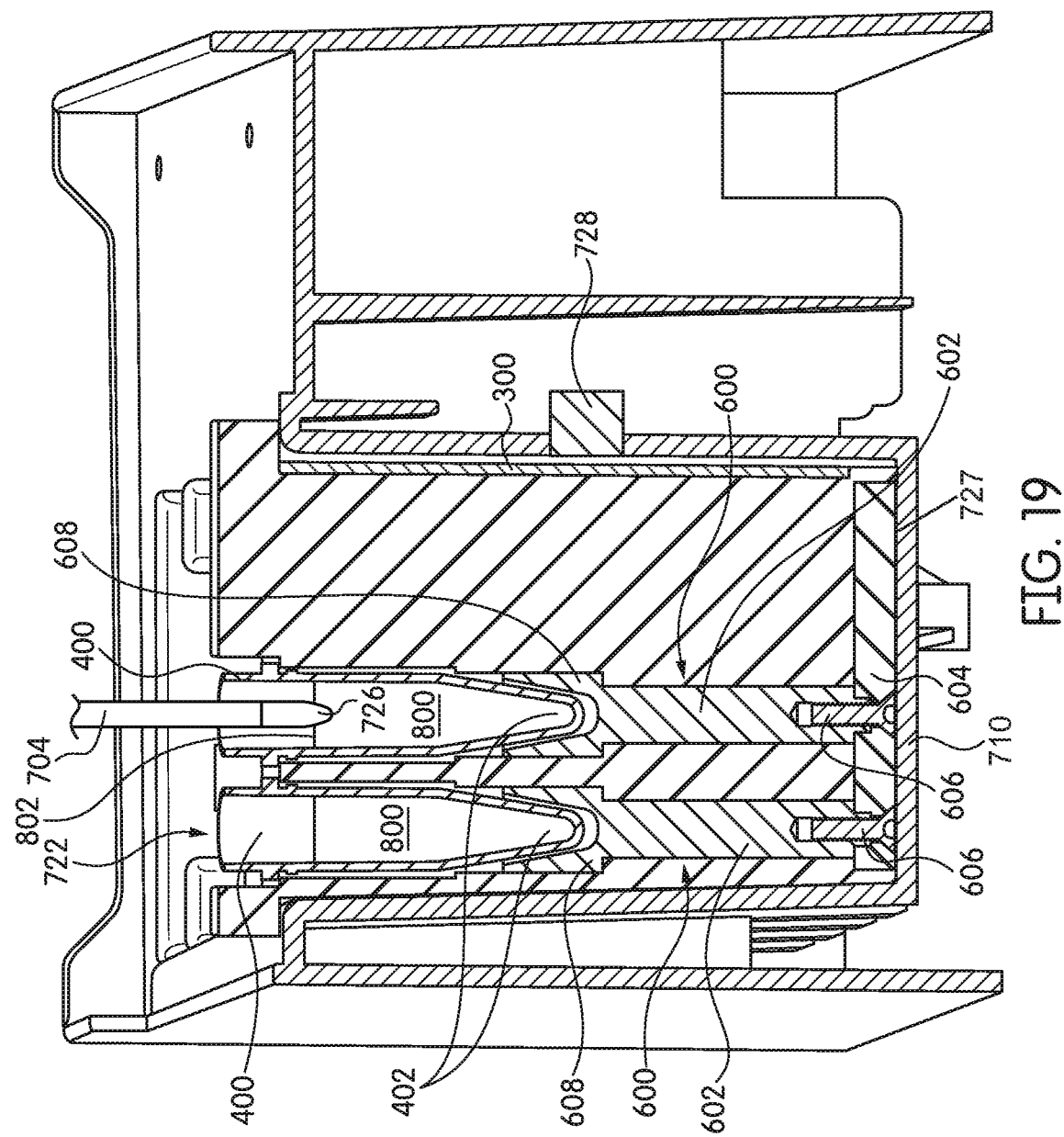
FIG. 19 is a cross-sectional view of a fluid drawer and another exemplary receptacle holder taken along line 18-18 in FIG. 17, according to an embodiment.

FIG. 19 illustrates an exemplary cross-sectional schematic view of receptacle holder 14, as described above, seated within recess 722 of frame 710 according to an embodiment. When receptacle holder 14 is seated within recess 722, conductive surface 727 of frame 710 contacts is adjacent to the conductive surface of bottom portion 604 of holder 14. Conductive surface of bottom portion 604 is capacitively coupled to fluid 800 contained within receptacle 400 via conductive portion 608 of electrical conductor 600 that is adjacent closed end 402 of receptacle 400. This electrically coupling enables the formation of an electrically conductive plane or circuit around holder 14 that can be used for capacitive fluid level detection as described above.

In some embodiments, sample processing instrument 700 also includes one or more RFID antennas 728 coupled to one or more RFID readers (sometimes referred to as an RFID interrogator) configured to receive information transmitted from RFID transponders 300 disposed on receptacles 719. For example, an RFID antenna 728 can be positioned adjacent each recess 722 of frame 710. As shown in FIGS. 18 and 19, RFID antenna 728 can be disposed on a lateral wall defining a portion of the respective recess 722.

The conductive plane formed by either by the receptacle holder (e.g., the conductive portion 102 of receptacle holder 10 or conductor 600 of receptacle 14) and conductive surface 727 of frame 710 is electrically insulated from RFID transponder 300 by the non-conductive portions (e.g., non-conductive portion 200 of holder 10, non-conductive portion 210 of holder 12, or non-conductive portion 500 of holder 14). This insulation reduces any interference to the information transmitted from RFID transponder 300 to an RFID antenna 728 of sample processing instrument 700.

In some embodiments, each recess 722 is configured to receive both a holder that supports fluid-containing receptacles 400 for processes having a known initial association with a particular process to be performed using fluid 800 contained in the fluid-containing receptacles 400 on a subset of a plurality of samples, and a holder that supports fluid-containing receptacles 400 for processes having no known initial association with a particular process to be performed using fluid 800 contained in the fluid-containing receptacles 400 on a another subset of a plurality of samples. In some of such embodiments, the holders for tests having known initial associations and the holders for tests having no known initial associations have the same general form factor such that the holders can be interchangeable seated within any recess 722 of the plurality of recesses 722.

In some embodiments, recesses 722 are each configured to directly receive a fluid-containing receptacles 721 (without a holder) for processes having a known initial associations with a particular process to be performed using fluid contained in that particular fluid-containing receptacle 721 on a first subset of a plurality of samples.

Exemplary Sample Processing Methods

Exemplary methods of processing a sample using fluids contained in receptacles supported by a holder on a drawer of a sample processing instrument will now be described. In some embodiments, frame 710 is moved to the opened position providing access to an operator. At the opened position, the operator can do one or more of the following:

load one or more fluid-containing receptacles 724 into the one or more recesses defined by receptacle holder 718 on frame 710;

load one or more receptacle holders 719 (e.g., holders 10, 12, and 14), which support one or more fluid-containing receptacles 400, onto frame 710 by inserting holders 719 into respective recesses 722;

load one or more fluid-containing receptacles (which are not supported by any holder) directly onto frame 710 by inserting receptacles into respective recesses 722; and load one or more fluid-containing receptacles 721 (which are not supported by any holder) directly onto frame 710 by inserting receptacles 721 into recesses 720.

After loading the holders and receptacles onto frame 710, the operator can move frame 710 from the opened position to the closed position. At the closed position, the holders (e.g., holders 718 and 719) and receptacles (e.g., receptacles 721) are positioned within sample processing instrument 700. When holders 719 are seated within the respective recesses, RFID transponders 300 on holders 719 are positioned within in the operational field of RFID antenna 728. At this point, RFID transponders 300 transmit information about the respective receptacle holders 719 to RFID antenna 728 of sample processing instrument 700. For example, RFID transponders 300 can transmit one or more of the following: (1) a receptacle identifier that identifies each receptacle 400 supported by receptacle holder 719; (2) a holder identifier that identifies receptacle holder 719; and (3) a process identifier that identifies the processes (e.g., tests) to be performed using fluids contained in the fluid-containing receptacles 400 supported by receptacle holder 719. Additionally, RFID antenna 728 can be used to determine the presence of a receptacle 719 in recess 722. For example, if RFID antenna 728 does not receive any transmitted information that would typically be transmitted by RFID transponder 300, this is an indication that no receptacle holder 719 is present within recess 722. The transmitted information can also indicate that the processes to be performed using fluids 800 contained in the fluid-containing receptacles supported by the receptacle holder 719, and sample processing instrument 700 can use this transmitted information to determine whether there are known associations between particular processes to be performed using fluids contained in the respective fluid-containing receptacles 719.

In some embodiments, the transmitted receptacle identifier or holder identifier has a known association with a particular process to be performed using fluid 800 contained in the respective fluid-containing receptacles 400 supported by receptacle holders 719. The steps of the particular process can also be stored on a storage device of sample processing instrument 700.

In some embodiments, the transmitted receptacle identifier or holder identifier does not have a known association with a particular process to be performed using fluid 800 contained in the respective fluid-containing receptacles 400 supported by receptacle holders 719. For example, in some embodiments, the transmitted information indicates that the processes to be performed using fluids 800 contained in the fluid-containing receptacles supported by the receptacle holder 719 are for processes for which there are no known associations with particular processes to be performed using fluids 800 contained in the respective fluid-containing receptacles 400 supported by receptacle holders 719.

If there is a known initial association with a particular process to be performed using fluid 800 contained in a particular fluid-containing receptacle 400 supported by a receptacle holder 719, sample processing instrument 700 can process one or more samples using fluid 800 without further user input based on protocols saved on a storage device of the sample processing instrument 700, in some embodiments. But if there is no known initial association with a particular process to be performed using fluid 800 contained in a particular fluid-containing receptacle 400 supported by a receptacle holder 719, additional user input can be required to associate fluid 800 with a particular process to be performed on a sample.

Figure 20:
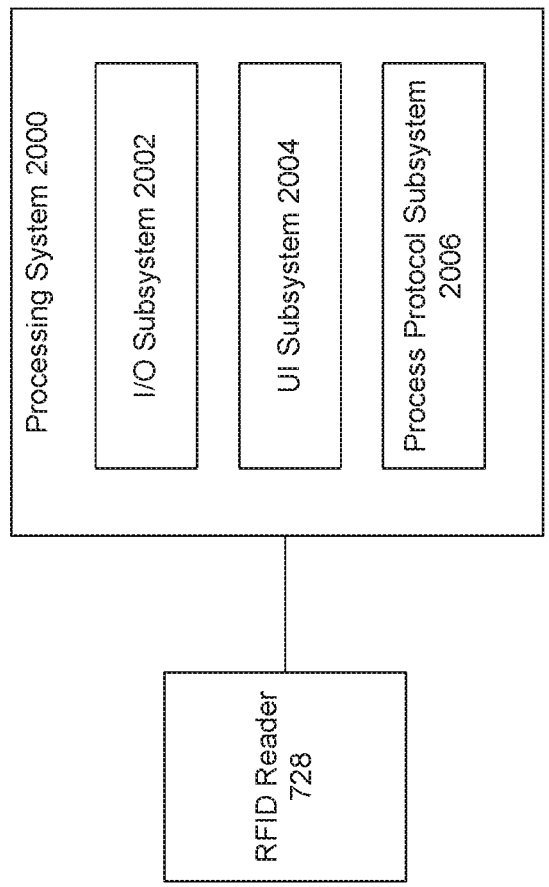
FIG. 20 is a diagram illustrating an example processing system in a sample processing instrument environment, according to an embodiment.

In some embodiments, sample processing instrument 700 is configured to prompt the operator to identify the particular process to be performed using fluid 800 contained in fluid-containing receptacle 400 supported by receptacle holder 719 when there is no known initial association. This association status is determined based on information transmitted by RFID transponder 300 to sample processing instrument 700. FIG. 20 is a diagram illustrating an example processing system 2000 of sample processing instrument 700 for prompting the operator to identify the particular process to be performed using fluid 800 contained in fluid-containing receptacle 400 supported by receptacle holder 719.

In the embodiment of FIG. 20, processing system 2000 includes three subsystems: I/O (input/output) subsystem 2002, UI (user interface) subsystem 2004, and a process protocol subsystem 2006. Each subsystem is described below in turn. I/O subsystem 2002 receives the information detected by RFID antenna 728 (which was transmitted from RFID transponder 300). UI subsystem 2004 provides user interfaces that allow an operator to interact with processing system 2000. For example, UI subsystem 2004 can provide a user interface displaying, for example, on a display, different choices or a prompt for processes to be performed using fluid 800 contained in fluid-containing receptacle 400 supported by receptacle holder 719. UI subsystem 2004 can then receive the operator indication of a process as one or more user inputs via, for example, a keyboard, mouse, touch-screen, or any other suitable user input device. UI subsystem 2004 can also provide a user interface displaying, for example, on a display, different choices or a prompt for the maximum quantity a particular process that can be performed using fluid 800 contained in fluid-containing receptacle 400 supported by receptacle holder 719. UI subsystem 2004 can then receive the operator indication of the maximum quantity a particular process can be performed using fluid 800 contained in fluid-containing receptacle 400 as one or more user inputs via, for example, a keyboard, mouse, touch-screen, or any other suitable user input device. Process Protocol subsystem 2006 can determine, based on information received by RFID antenna 728 from RFID transponder 300, whether the fluid 800 contained in fluid-containing receptacle 400 supported by receptacle holder 719 has a known association with process protocols stored on a storage device of sample processing instrument 700. Protocol subsystem 2006 can also execute the protocols stored on a storage device of sample processing instrument 700 to process a sample. Process protocol subsystem 2006 can execute these protocols based on the user inputs received using UI subsystem 2004.

Figure 21:
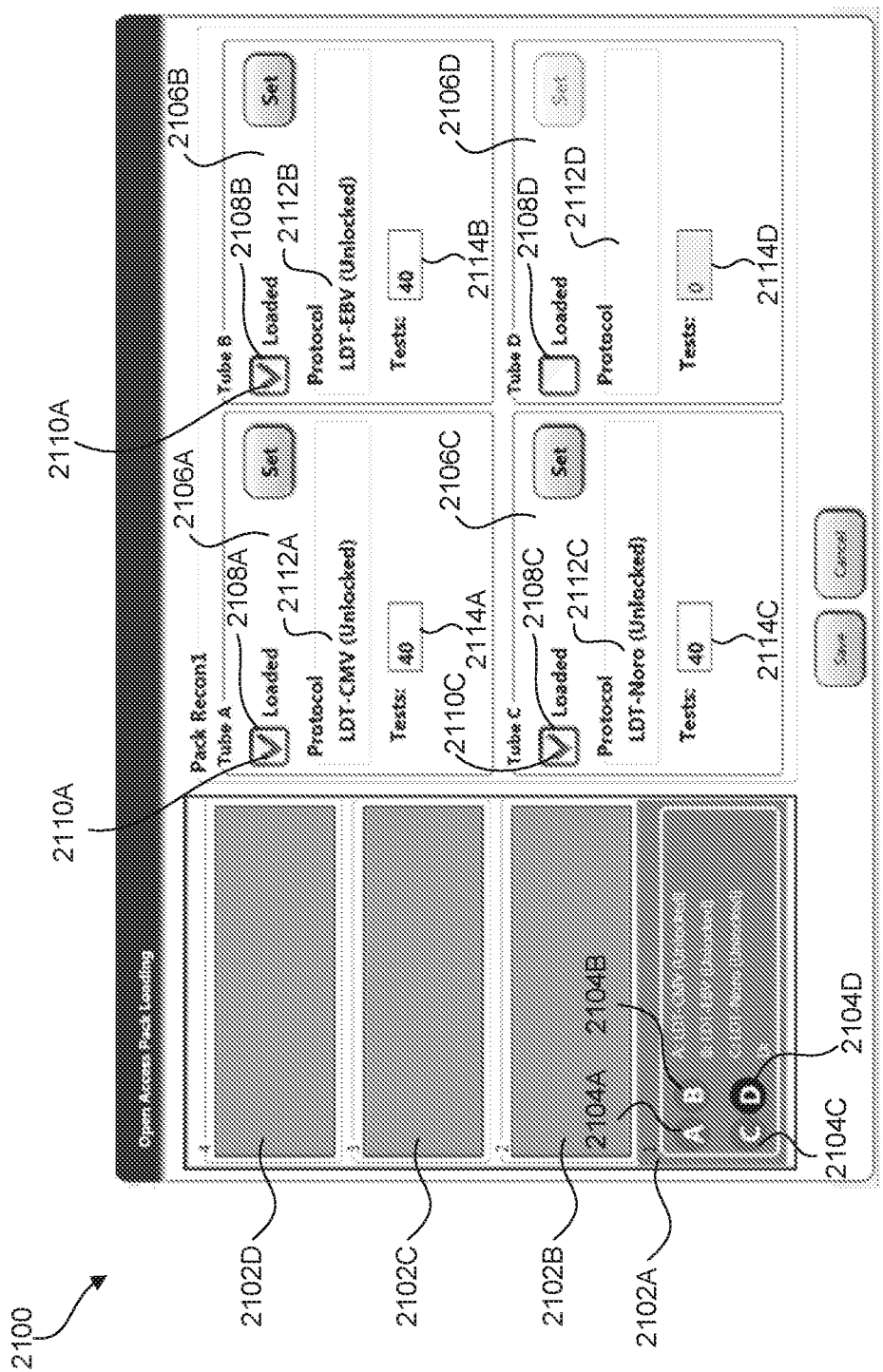
FIG. 21 is an exemplary graphical user interface, according to an embodiment.

In some embodiments, UI subsystem 2004 is configured to display a graphical user interface (GUI) on display that prompts the operator to provide information when there is no known initial association with protocols stored on a storage device of sample processing instrument 700. FIG. 21 illustrates an exemplary GUI 2100 according to an embodiment for acquiring such information.

As shown in FIG. 21, GUI 2100 can include icons 2102A-2102D that represent each recess 722 of frame 710. Icons 2102A-2102D can be rectangles as shown in FIG. 21, or any other shape or symbol. UI subsystem 2004 can be configured to change a characteristic of icons 2102A-2102D to indicate the presence or absence of a holder 719 or receptacle within recess 722. For example, icons 2104A-2104D, which represent each possible receptacle that could be supported by holder 719, could be displayed within icons 2102A-2102D, as shown in FIG. 21. And for example, the color of icons 2102A-2102D can change based on the presence or absence of receptacle holder 719 in recess 722.

In some embodiments, GUI 2100 prompts the operator for information about each possible fluid-containing receptacle 400 that could be supported by receptacle holder 719, and GUI 2100 can receive one or more user inputs representing the requested information. In some embodiments, the operator provides the user inputs after the operator visually references any user-provided indicators on the holder, for example, indicators provided on surfaces 118, 218, and 518 described above. For example, GUI 2100 can include a plurality of areas 2106A-2106D associated with each recess (for example, recesses 104, 204, and 504 described above) that contains one or more visual prompts for additional information. Each area 2106A-2106D can have a label that corresponds with indicators 114, 216, and 514 on holders 719. For example, areas 2106A-2106D are labeled "Tube A," "Tube B," "Tube C," and "Tube D," respectively.

In some embodiments, areas 2106A-2106D are configured to prompt the operator for an indication that a receptacle is present on a detected receptacle holder 719. For example, areas 2106A-2106D include respective sub-areas 2108A-2108D configured to receive a user-input, for example, a click of a mouse, touch on a touchscreen, or a keystroke on a keyboard, that indicates whether a receptacle is present in a detected receptacle holder 719. Sub-areas 2108A-2108D can be labeled "Loaded." GUI 2100 can be configured to display an icon that represents this user-inputted indication. For example, GUI 2100 displayed check marks 2110A, 2110B, and 2110C in respective sub-areas 2108A, 2108B, 2108C that indicate the receptacles are present within the respective recesses of holder 719. No icon being displayed in sub-areas 2108D indicates that no receptacle 400 is received within the recess of holder 719 associated with area 2106D.

In some embodiments, areas 2106A-2106D are configured to prompt the operator for an indication of the particular process to be performed using fluid contained in the respective fluid-containing receptacles 400 supported by receptacle holders 719. For example, areas 2106A-2106D include respective sub-areas 2112A-2112D configured to receive a user-input, for example, alphanumeric text entered with a keyboard or touch screen, or selection from a drop down menu of process options using, for example, a mouse, a touchscreen, or a keyboard, that indicates the particular process to be performed using fluid contained in the respective fluid-containing receptacles 400 supported by receptacle holders 719. GUI 2100 can be configured to display alphanumeric tests or icons that represent this user-inputted process indication. For example, as shown in FIG. 21, GUI 2100 displays alphanumeric text that indicates the name of the user-input process indication in sub-areas 2112A-2112C.

In some embodiments, areas 2106A-2106D are configured to prompt the operator for an indication of the maximum number of times the particular process can be performed using fluid contained in the respective fluid-containing receptacles 400 supported by receptacle holders 719. For example, areas 2106A-2106D include respective sub-areas 2114A-2114D configured to receive a user-input, for example, alphanumeric text entered with a keyboard or touch screen, or selection from a drop down menu of process options using, for example, a mouse, a touchscreen, or a keyboard, that indicates the maximum number of times the particular process can be performed using fluid contained in the respective fluid-containing receptacles 400 supported by receptacle holders 719. GUI 2100 can be configured to display alphanumeric text or icons that represent this user-input quantity indication. For example, as shown in FIG. 21, GUI 2100 displays alphanumeric text that indicates the maximum number of times in sub-areas 2114A-2114C.

The user-input received by sample processing instrument 700 using, for example, GUI 2100, is stored in a storage device (e.g., any type of random access memory, hard drives, floppy disks, CD ROMS, ZIP disks, tapes, magnetic storage devices, optical storage devices, MEMS, nano-technological storage devices, etc.), and can be used for subsequent sample processing.

In some embodiments, processing protocol subsystem 2006 associates a particular protocol stored on storage device of sample processing instrument 700 with the respective receptacle on frame 710 based on the user-input process indications received, for example, using sub-areas 2212 and 2114 of GUI 2100. So when that particular protocol is scheduled to be performed on a sample, sample processing instrument 700 will use fluid contained with that particular receptacle 400 on frame 710. That is, although there was no known initial association with a particular process to be performed using fluid 800 contained in that particular fluid-containing receptacle 400 supported by receptacle holder 719 when frame 710 was initially moved to the closed position, processing protocol subsystem 2006 creates an association with a particular process based on user input received by UI subsystem 2004 and GUI 2100. For example, when the fluid contained within a receptacle is for a process for which there is no known association with a particular test protocol stored on storage device of sample processing instrument 700, the operator can use UI subsystem 2004 and GUI 2100 to associate the fluid with a particular test protocol stored on storage device of sample processing instrument 700.

These steps can be repeated for each additional receptacle holder 719 detected to be loaded on frame 710.

If a receptacle holder 719 is removed from recess 722, UI subsystem 2004 can be configured to automatically prompt the operator for information about each possible fluid-containing receptacle that could be supported by holder 719 the next time a holder is detected to be present in recess 722. This helps ensure that a different holder with different fluid-containing receptacles is not associated with the incorrect process.

The fluid-containing receptacles not having an initial association with a particular process are associated with a particular process protocol based on the received user-inputs using UI subsystem 2004 and the information transmitted from RFID transponder 300 on the receptacle 719. The fluid-containing receptacles can also be used to process samples according to that particular process protocol. For example, when a step of a process protocol is scheduled to be performed with a particular fluid contained within a receptacle associated with the process protocol, fluid transfer device 704 can be aligned with the associated receptacle containing the fluid for aspiration. Fluid transfer device 704 can then be advanced toward fluid 800 in receptacle 400. The fluid level of fluid 800 can be determined by detecting a change in capacitance between an electrically conductive probe 726 of the robotic fluid transfer device 704 and an electrical ground capacitively coupled to fluid 800 contained in fluid-containing receptacle 400, as described above. Fluid transfer device 704 can then aspirate at least a portion of fluid 800 contained in fluid-containing receptacle 400. Fluid transfer device 704 can then move to be aligned with another receptacle. At that point, fluid transfer device 704 can dispense the aspirated portion of fluid 800 into the other receptacle.

These steps can be repeated when a step of a another process protocol is scheduled to be performed using another fluid contained within a different receptacle associated with the other process protocol, except that fluid 800 is aspirated from the new associated receptacle.

Various aspects of the disclosure can be implemented on sample processing instrument 700 by software, firmware, hardware, or a combination thereof. Sample processing instrument 700 can include one or more processors, which can be a special purpose or a general purpose processor. The processor is connected to a communication infrastructure (for example, a bus or network). The processor can include a CPU, a Graphics Processing Unit (GPU), an Accelerated Processing Unit (APU), a Field-Programmable Gate Array (FPGA), Digital Signal Processing (DSP), or other similar general purpose or specialized processing units.

Sample processing instrument 700 can include one or more storage devices, for example, a main memory and a secondary memory. The main memory can be a volatile memory or non-volatile memory, and divided into channels. The secondary memory can include, for example, non-volatile memory such as a hard disk drive, a removable storage drive (e.g., floppy disk drive, a magnetic tape drive, an optical disk drive, a flash memory, or the like), and/or a memory stick. The removable storage drive reads from and/or writes to a removable storage unit in a well-known manner. Removable storage unit can include a floppy disk, magnetic tape, optical disk, etc. which is read by and written to by removable storage drive. As will be appreciated by persons skilled in the relevant art(s), the removable storage unit includes a computer usable storage medium having stored therein computer software and/or data.

In alternative implementations, secondary memory can include other similar means for allowing computer programs or other instructions (e.g., process protocols) to be loaded into sample processing instrument 700. Such means can include, for example, a removable storage unit and an interface. Examples of such means can include a program cartridge and cartridge interface (such as that found in video game devices), a removable memory chip (such as an EPROM, or PROM) and associated socket, and other removable storage units and interfaces which allow software and data to be transferred from the removable storage unit to sample processing instrument 700.

Sample processing instrument 700 can also include a memory controller. The memory controller includes functionalities to control data access to the main memory and the secondary memory. In some embodiments, the memory controller can be external to the processor. In other embodiments, the memory controller can also be directly part of the processor. For example, many AMD™ and Intel™ processors use integrated memory controllers that are part of the same chip as the processor.

Sample processing instrument 700 can also include a communications and network interface. The communication and network interface allows software and data to be transferred between sample processing instrument 700 and external devices. The communications and network interface can include a modem, a communications port, a PCMCIA slot and card, or the like. Software and data transferred via communications and network interface are in the form of signals which can be electronic, electromagnetic, optical, or other signals capable of being received by the communication and network interface. These signals are provided to the communication and network interface via a communication path. The communication path carries signals and can be implemented using wire or cable, fiber optics, a phone line, a cellular phone link, an RF link or other communications channels.

The communication and network interface allows the sample processing instrument 700 to communicate over communication networks or mediums such as LANs, WANs, the Internet, etc. The communication and network interface can interface with remote sites or networks via wired or wireless connections.

In this document, the terms "computer program medium," "computer-usable medium" and "non-transitory medium" are used to generally refer to tangible media such as the removable storage unit, the removable storage drive, and a hard disk installed in the hard disk drive. Signals carried over the communication path can also embody the logic described herein. Computer program medium and computer usable medium can also refer to memories, such as the main memory and the secondary memory, which can be memory semiconductors (e.g. DRAMs, etc.). These computer program products are means for providing software to sample processing instrument 700.

Computer programs (also called computer control logic) are stored in the main memory and/or the secondary memory. The computer programs can also be received via the communication and network interface. Such computer programs, when executed, enable sample processing instrument 700 to implement embodiments as described herein. In particular, the computer programs, when executed, enable sample processing instrument 700 to implement a desired sample process, such as the steps in the methods described above. Accordingly, such computer programs represent controllers of the sample processing instrument 700. Where the embodiments are implemented using software, the software can be stored in a computer program product and loaded into sample processing instrument 700 using the removable storage drive, the interfaces, the hard drive, or the communication and network interface, for example.

Sample processing instrument 700 can also include input/output/display devices, such as keyboards, monitors, pointing devices, touchscreens, etc.

It should be noted that the simulation, synthesis and/or manufacture of various embodiments can be accomplished, in part, through the use of computer readable code, including general programming languages (such as C or C++), hardware description languages (HDL) such as, for example, Verilog HDL, VHDL, Altera HDL (AHDL), or other available programming and/or schematic capture tools (such as circuit capture tools). This computer readable code can be disposed in any known computer-usable medium including a semiconductor, magnetic disk, optical disk (such as CD-ROM, DVD-ROM). As such, the code can be transmitted over communication networks including the Internet. It is understood that the functions accomplished and/or structure provided by the systems and techniques described above can be represented in a core that is embodied in program code and can be transferred to hardware as part of the production of integrated circuits.

The embodiments are also directed to computer program products comprising software stored on any computer-usable medium. Such software, when executed in one or more data processing devices, causes a data processing device(s) to operate as described herein or, as noted above, allows for the synthesis and/or manufacture of electronic devices (e.g., ASICs, or processors) to perform embodiments described herein. Embodiments employ any computer-usable or computer-readable medium, and any computer-usable or computer-readable storage medium known now or in the future. Examples of computer-usable or computer-readable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nano-technological storage devices, etc.), and communication mediums (e.g., wired and wireless communications networks, local area networks, wide area networks, intranets, etc.). Computer-usable or computer-readable mediums can include any form of transitory (which include signals) or non-transitory media (which exclude signals). Non-transitory media includes, by way of non-limiting example, the aforementioned physical storage devices (e.g., primary and secondary storage devices).

While various embodiments of the present invention have been described above, it should be understood that they have been presented by way of example, and not limitation. It will be apparent to persons skilled in the relevant art that various changes in form and detail can be made therein without departing from the scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

Although specific embodiments are described above, as a person skilled in the art would recognize, many variations of the disclosed embodiments are possible, and therefore, within the scope of this disclosure.

What is claimed is:

1. A receptacle holder for supporting at least one fluid-containing receptacle, comprising:
  a body comprising:
    an electrically conductive portion comprising:
      an upper portion defining an exterior upper surface of the body and a first recess extending from the exterior upper surface, the upper portion comprising an upper flange extending outward from the exterior upper surface,
      a bottom portion defining an exterior bottom surface of the body, the bottom portion comprising a bottom flange disposed below the upper flange,
      wherein the upper flange and the bottom flange define a side recess opened through lateral side surfaces of the electrically conductive portion, and
    an electrically non-conductive portion received in the side recess of the electrically conductive portion and attached to the electrically conductive portion;
  an RFID transponder disposed on the electrically non-conductive portion of the body, and storing information about the receptacle holder; and
  a first fluid-containing receptacle received within the first recess.

2. The receptacle holder of claim 1, wherein the electrically conductive portion further defines a second recess extending from the exterior upper surface and configured to receive a second fluid-containing receptacle.

3. The receptacle holder of claim 2, wherein the first recess and the second recess have the same dimensions.

4. The receptacle holder of claim 1, wherein the first recess conforms to the shape of the first fluid-containing receptacle.

5. The receptacle holder of claim 1, wherein:
  the electrically non-conductive portion defines a recess; and
  the RFID transponder is disposed entirely within the recess defined by the electrically non-conductive portion.

6. The receptacle holder of claim 1, wherein the information about the receptacle holder comprises at least one of (a) a receptacle identifier, (b) a holder identifier, and (c) an identifier of a process to be performed using fluid contained in the first fluid-containing receptacle.

7. The receptacle holder of claim 6, wherein:
  the information about the receptacle holder comprises at least one of (a) the receptacle identifier and (b) the holder identifier; and
  the at least one of (a) the receptacle identifier and (b) the holder identifier indicates what process is to be performed using fluid contained in the first fluid-containing receptacle.

8. The receptacle holder of claim 1, wherein the electrically conductive portion is a single unitary piece.

9. The receptacle holder of claim 1, wherein the electrically non-conductive portion is a single unitary piece.

10. The receptacle holder of claim 1, wherein the electrically non-conductive portion defines a channel that is (a) configured to receive a portion of the first fluid-containing receptacle, and (b) axially aligned with the first recess of the electrically conductive portion.

11. The receptacle holder of claim 1, wherein the electrically non-conductive portion is fastened to the electrically conductive portion using at least one fastener.

12. The receptacle holder of claim 1, wherein the upper flange comprises a surface configured to receive a user-provided indicator of a process to be performed using fluid in the first fluid-containing receptacle.

13. The receptacle holder of claim 12, wherein:
  the surface configured to receive the user-provided indicator comprises a dry-erase writing surface.

14. The receptacle holder of claim 1, wherein lateral side surfaces of the electrically non-conductive portion are flush with the lateral side surfaces of the electrically conductive portion.

15. A receptacle holder for supporting at least one fluid-containing receptacle, comprising:
a body comprising:
an electrically non-conductive portion defining an upper section of a first recess;
an electrical conductor comprising:
a first electrically conductive portion disposed within the electrically non-conductive portion and defining a lower section of the first recess configured to receive a closed end portion of the first fluid-containing receptacle, and
a second electrically conductive portion electrically coupled to the first electrically conductive portion, and configured to be electrically coupled to an electrical ground or voltage source separate from the receptacle holder;
an RFID transponder disposed on the electrically non-conductive portion, and storing information about the receptacle holder; and
a first fluid-containing receptacle received within the first recess,
wherein the upper section of the first recess defined in the electrically non-conductive portion and the lower section of the first recess defined in the first electrically conductive portion collectively conform to the shape and the dimensions of the first fluid-containing receptacle.

16. The receptacle holder of claim 15, wherein the second electrically conductive portion defines an exterior surface of the body.

17. The receptacle holder of claim 16, wherein the exterior surface comprises a bottom surface of the body.

18. The receptacle holder of claim 15, wherein the first electrically conductive portion and the second electrically conductive portion are discrete components.

19. The receptacle holder of claim 18, wherein the first electrically conductive portion is attached to the second electrically conductive portion.

20. The receptacle holder of claim 15, wherein the first electrically conductive portion and the second electrically conductive portion are integral components forming a single unitary piece.

21. The receptacle holder of claim 15, wherein the electrically non-conductive portion further defines an upper section of a second recess configured to receive a second fluid containing receptacle, and the first electrically conductive portion further defines a lower section of the second recess configured to receive a closed end portion of the second fluid-containing receptacle.

22. The receptacle holder of claim 21, wherein the first recess and the second recess have the same dimensions.

23. The receptacle holder of claim 15, wherein:
the electrically non-conductive portion defines a recess; and
the RFID transponder is disposed entirely within the recess defined by the electrically non-conductive portion.

24. The receptacle holder of claim 15, wherein the information about the receptacle holder comprises at least one of (a) a receptacle identifier, (b) a holder identifier, and (c) an identifier of a process to be performed using fluid contained in the first fluid-containing receptacle.

25. The receptacle holder of claim 24, wherein:
the information about receptacle holder comprises at least one of (a) the receptacle identifier and (b) the holder identifier; and
the at least one of (a) the receptacle identifier and (b) the holder identifier indicates what process is to be performed using fluid contained in the first fluid-containing receptacle.

26. The receptacle holder of claim 15, wherein the electrically non-conductive portion is a single unitary piece.

27. The receptacle holder of claim 15, further comprising a surface configured to receive a user-provided indicator of a process to be performed using fluid in the first fluid-containing receptacle.

28. The receptacle holder of claim 27, wherein:
the surface configured to receive the user-provided indicator comprises a dry-erase writing surface.

* * * * *

UNITED STATES PATENT AND TRADEMARK OFFICE
CERTIFICATE OF CORRECTION

PATENT NO. : 11,759,785 B2
APPLICATION NO. : 16/629823
DATED : September 19, 2023
INVENTOR(S) : Trung Q. Pham et al.

It is certified that error appears in the above-identified patent and that said Letters Patent is hereby corrected as shown below:

In the Specification

In Column 4, Line 5, delete "holder," and insert -- holder. --, therefor.
In Column 5, Line 17, delete "operational" and insert -- operation --, therefor.
In Column 7, Line 25, delete "capable" and insert -- capable of --, therefor.
In Column 7, Line 33, delete "capable" and insert -- capable of --, therefor.
In Column 10, Line 63, delete "there between." and insert -- therebetween. --, therefor.
In Column 11, Line 28, delete "form" and insert -- from --, therefor.
In Column 11, Line 34, delete "text" and insert -- texted --, therefor.
In Column 15, Line 5, delete "into a" and insert -- into an --, therefor.
In Column 19, Line 65, delete "400" and insert -- 400. --, therefor.
In Column 22, Line 4, delete "reactions (TMA)," and insert -- (TMA) reactions, --, therefor.
In Column 22, Line 48, delete "708." and insert -- 708). --, therefor.
In Column 25, Line 19, delete "fluid in" and insert -- fluid is --, therefor.
In Column 26, Line 34, delete "either by".
In Column 26, Line 53, delete "on a" and insert -- on --, therefor.
In Column 26, Line 57, delete "interchangeable" and insert -- interchangeably --, therefor.
In Column 27, Line 26, delete "within in" and insert -- within --, therefor.
In Column 28, Line 47, delete "quantity" and insert -- quantity of --, therefor.
In Column 28, Line 51, delete "quantity a particular process can be performed" and insert -- "quantity of a particular process that can be performed" --, therefor.
In Column 30, Line 22, delete "CD ROMS," and insert -- CD-ROMs, --, therefor.
In Column 31, Line 17, delete "of a" and insert -- of --, therefor.
In Column 33, Line 21, delete "CD ROMS," and insert -- CD-ROMs, --, therefor.

Signed and Sealed this
Thirtieth Day of January, 2024

Katherine Kelly Vidal
*Director of the United States Patent and Trademark Office*